US012424782B2

(12) United States Patent
Enomoto et al.

(10) Patent No.: US 12,424,782 B2
(45) Date of Patent: Sep. 23, 2025

(54) CONNECTOR WITH IMPROVED INSERTION

(71) Applicant: Nippon Tanshi Co., Ltd., Hiratsuka (JP)

(72) Inventors: Shinya Enomoto, Hiratsuka (JP); Osamu Nishimura, Hiratsuka (JP)

(73) Assignee: Nippon Tanshi Co., Ltd., Hiratsuka (JP)

( * ) Notice: Subject to any disclaimer, the term of this patent is extended or adjusted under 35 U.S.C. 154(b) by 345 days.

(21) Appl. No.: 18/042,254

(22) PCT Filed: Aug. 6, 2021

(86) PCT No.: PCT/JP2021/029308
§ 371 (c)(1),
(2) Date: Feb. 20, 2023

(87) PCT Pub. No.: WO2022/039055
PCT Pub. Date: Feb. 24, 2022

(65) Prior Publication Data

US 2023/0318218 A1 Oct. 5, 2023

(30) Foreign Application Priority Data

Aug. 21, 2020 (JP) ................................. 2020-139860

(51) Int. Cl.
*H01R 13/422* (2006.01)
*H01R 13/428* (2006.01)
(Continued)

(52) U.S. Cl.
CPC ....... *H01R 13/4223* (2013.01); *H01R 13/428* (2013.01); *H01R 13/629* (2013.01); *H01R 13/639* (2013.01)

(58) Field of Classification Search
CPC .............. H01R 13/4233; H01R 13/428; H01R 13/629; H01R 13/639; H01R 24/00;
(Continued)

(56) References Cited

U.S. PATENT DOCUMENTS 5,622,521 A 4/1997 Marceau et al.
7,232,339 B1 * 6/2007 Wilson .................. H01R 13/64 439/744
(Continued)

FOREIGN PATENT DOCUMENTS

JP H0729759 U 6/1995
JP 2012-014862 A 1/2012
(Continued)

OTHER PUBLICATIONS

English Translation of JP 2015035393 (Year: 2025).*
(Continued)

*Primary Examiner* — Tulsidas C Patel
*Assistant Examiner* — Carlos E Lopez-Pagan
(74) *Attorney, Agent, or Firm* — Dority & Manning. P.A.

(57) ABSTRACT

A connector includes a housing having an elastic locking piece and a terminal hole defining a terminal receptacle compartment extending in an insertion direction; and a terminal member to be inserted into the terminal receptacle compartment from rear to front along the insertion direction, wherein the terminal member has a first opening configured to be engaged with the locking piece when the connector is assembled, and a second opening defined on the front side of the first opening, and wherein a projection is formed on the terminal member and prevents the locking piece from being engaged with the second opening when the terminal member is inserted or removed, which prevents a user from wrongly perceiving that the insertion of the terminal mem-
(Continued)

ber is completed despite not having achieved engagement between the locking piece and the first opening.

8 Claims, 22 Drawing Sheets

(51) Int. Cl.
*H01R 13/629* (2006.01)
*H01R 13/639* (2006.01)

(58) Field of Classification Search
CPC .. H01R 24/60; H01R 24/62; H01R 13/62905; H01R 13/62911; H01R 13/5045; H01R 12/721
USPC .......................................................... 439/877
See application file for complete search history.

(56) References Cited

U.S. PATENT DOCUMENTS

| | | | | |
|---|---|---|---|---|
| 2002/0193012 | A1* | 12/2002 | Mase | H01R 13/4362 439/752 |
| 2004/0147175 | A1* | 7/2004 | Aihara | H01R 43/22 439/752 |
| 2005/0197009 | A1* | 9/2005 | Sasaki | H01R 13/4223 439/595 |
| 2006/0068647 | A1* | 3/2006 | Kojima | H01R 13/4362 439/752 |
| 2016/0322728 | A1* | 11/2016 | Endo | H01R 13/5208 |
| 2018/0034177 | A1* | 2/2018 | Enomoto | H01R 12/721 |
| 2019/0089080 | A1* | 3/2019 | Hayashi | H01R 13/11 |
| 2019/0393638 | A1* | 12/2019 | Chiba | H01R 13/424 |

FOREIGN PATENT DOCUMENTS

| | | |
|---|---|---|
| JP | 2015-035393 A | 2/2015 |
| JP | 2018-018749 A | 2/2018 |

OTHER PUBLICATIONS

International Search Report for Application No. PCT/JP2021/029308 mailed on Oct. 12, 2021, 2 pages.
Japanese Office Action (w/English translation) for corresponding Application No. 2022-543884, dated Feb. 4, 2025, 8 pages.

* cited by examiner

Fig.10A
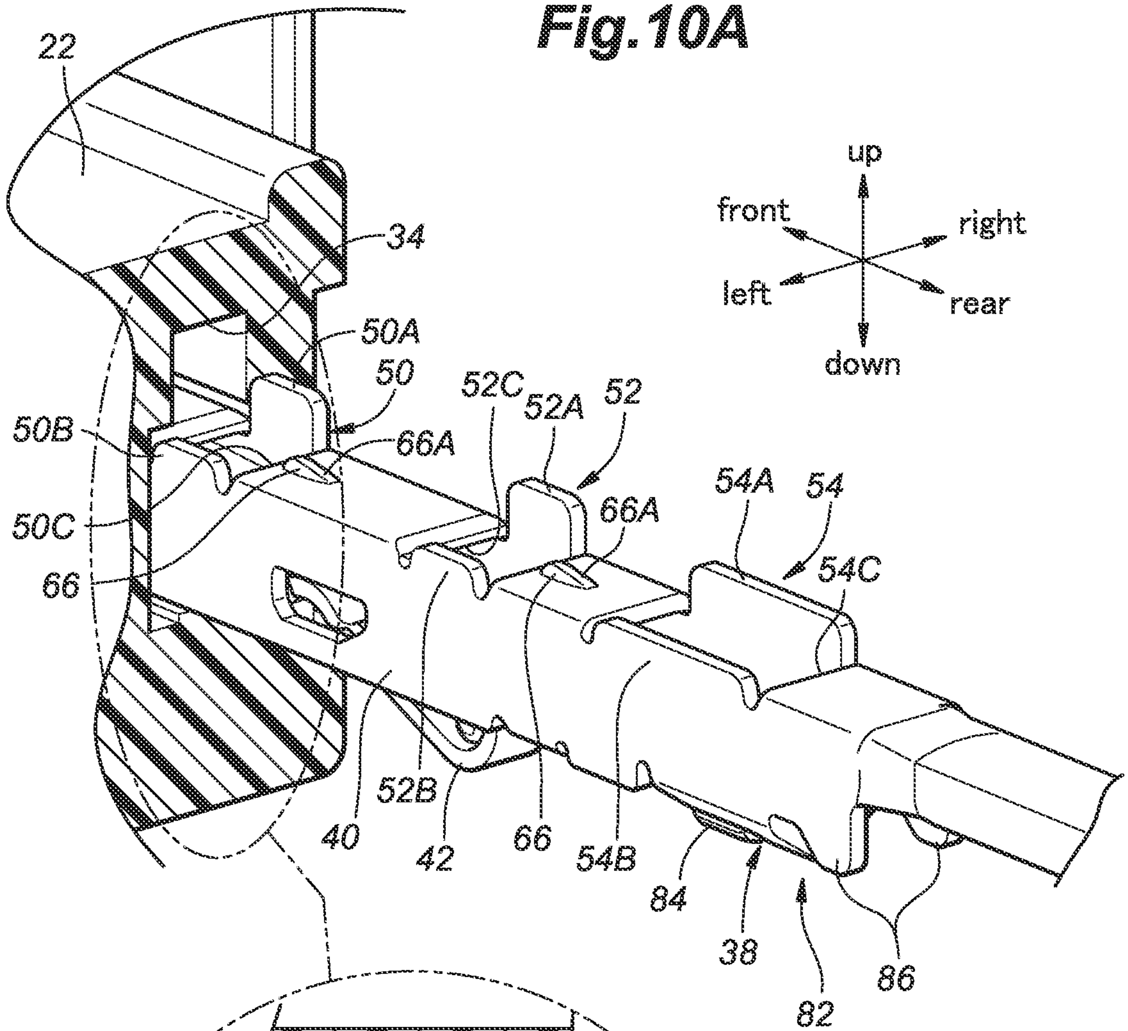
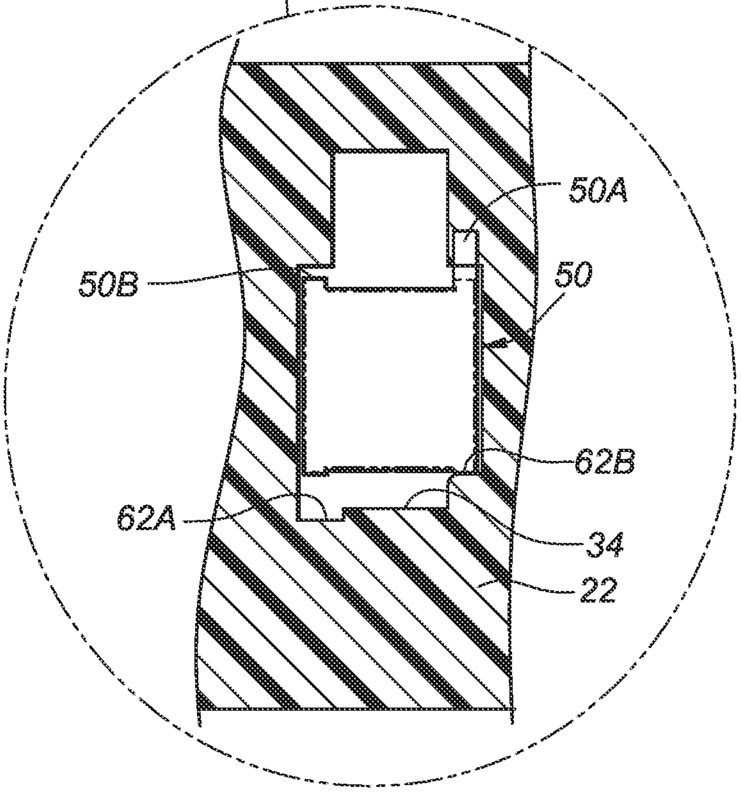
Fig.10B

CONNECTOR WITH IMPROVED INSERTION

CROSS REFERENCE TO RELATED APPLICATIONS

This application is the U.S. National Stage entry of International Application No. PCT/JP2021/029308, filed on Aug. 6, 2021, which, in turn, claims priority to Japanese Patent Application No. 2020-139860, filed on Aug. 21, 2020, both of which are hereby incorporated herein by reference in their entireties for all purposes.

TECHNICAL FIELD

The present invention relates to a connector comprising a connector housing and a terminal adapted to be inserted into a terminal hole in the connector housing.

BACKGROUND ART

Known types of connectors include a double-sided card edge connector comprising a terminal member; and a connector housing (hereafter also referred to as "housing") including a terminal receptacle recess (terminal hole) into which the terminal member is inserted, where a bottom of the terminal member defines an opening (hereafter also referred to as "first opening"), and the housing includes a lance piece that can be engaged with the first opening to thereby act as a locking part for the terminal member (Patent Document 1, for example).

PRIOR ART DOCUMENT(S)

Patent Document(s)

Patent Document 1: Japanese Patent Application No. 2016-149459

SUMMARY OF THE INVENTION

Task to be Accomplished by the Invention

When a terminal member is formed by press-forming of a metal sheet material, an R surface (i.e., curved surface) is formed at a folded part of the material, which can result in the formation of a gap between the terminal member and intersecting wall surfaces including an inner side surface and a bottom surface. The inventors of the present invention have found that such a gap can be filled by providing a pair of raised pieces formed by cutting and bending parts of the bottom of the terminal member downward so as to form approximately right angled pieces along the edges of both sides of the terminal member, thereby stabilizing the posture of the terminal member during insertion to prevent the terminal member from falling over sideways.

Furthermore, the inventors have also conceived a connector in which a rail is provided on the bottom wall of the terminal hole, and pairs of raised pieces are provided on the bottom of the terminal member such that the rail can be located between the pairs of raised pieces so as to slidingly guide the movement of the terminal member.

In this way, one or more pairs of raised pieces may be provided on a terminal member for the purpose of improving the ease of installation and operation of the terminal member. As a terminal member is a press-molded product, when raised pieces are formed on the terminal member, an opening (hereafter also referred to as "second opening") is defined therein.

When the second opening of a terminal member is formed on the front side of the first opening along an insertion direction, during insertion of the terminal member into a terminal hole, a locking piece is engaged with the second opening before being engaged with the first opening. Thus, a worker installing the terminal member is likely to mistakenly perceive a feel of engagement between the locking piece and the second opening as that between the locking piece and the first opening and wrongly perceive that the insertion of the terminal member is completed despite not having achieved the complete insertion of the terminal member.

The task to be accomplished by the present invention is to provide a connector comprising a housing having a locking piece and a terminal hole into which a terminal member is inserted, wherein the terminal member defines therein a first opening with which the locking piece can be engaged and a second opening located frontward of the first opening along an inserting direction from a front to a rear, and wherein the connector is configured to prevent a worker from wrongly perceiving that the insertion of the terminal member is completed despite not having achieved engagement between the first opening and the locking piece.

Means to Accomplish the Task

An aspect of the present invention provides a connector (10, 210, 310, 410, 510), comprising: a housing (22, 222, 322, 422, 522) having a terminal hole (34, 234, 334, 434) and an elastic locking piece (56A, 256A, 356A, 456A), wherein the terminal hole defines a terminal receptacle compartment (35, 235, 335, 435) extending in a predetermined direction; and a terminal member (38) adapted to be inserted into the terminal receptacle compartment in an insertion direction; that is, from a rear toward a front, wherein the terminal member has a first opening (54C) with which the elastic locking piece is engaged when the terminal member is installed in the housing; a second opening (50C, 52C) defined at a location on the front side of the first opening; and a projection (66) is formed thereon so as to prevent the elastic locking piece from being engaged with the second opening when the terminal member is being inserted into or removed from the housing.

In this configuration, when the terminal member is inserted or removed, the projection prevents the elastic locking piece from being engaged with the second opening, which is not an opening (first opening) with which the locking piece is to be engaged. As a result, a worker assembling the connector is prevented from wrongly perceiving that the insertion of the terminal member is completed despite not having achieved engagement between the locking piece and the first opening.

In one preferred embodiment, the above connector may be further configured such that the terminal member is formed of a folded plate material, and wherein the terminal member has pairs of legs (50A, 50B, 52A, 52B, 54A, 54B), each pair of legs vertically protruding from and extending along edges of both sides of a corresponding one of the first and second openings.

In this configuration, the legs of the terminal member can be formed by cutting along the edges of portions of a plate material where first and second openings are formed and then raising (bending upward) those portions. This feature eliminates the need to cut out the portions where first and second openings are formed in manufacturing the terminal member.

In one preferred embodiment, the above connector may be further configured such that, when the terminal member is inserted into the housing, the elastic locking piece can be located between each pair of the legs so as to slidingly guide the movement of the terminal member along the insertion direction.

This configuration allows the movement of a terminal member to be guided during insertion, which facilitates installation of the terminal member.

In one preferred embodiment, the above connector may be further configured such that each pair of the legs consists of opposite legs having different projection heights, and wherein walls defining the terminal receptacle compartment include slide surfaces (62SA, 62SB) extending in the insertion direction at vertical locations corresponding to the projection heights of the legs so that the opposite legs can slide on the corresponding slide surfaces.

This configuration does not allow a terminal member that is inverted upside down to be inserted into a terminal hole, which prevents incorrect insertion of the terminal member.

In one preferred embodiment, the above connector may be further configured such that the elastic locking piece of the housing is a cantilevered piece that extends out from the rear to the front, i.e., in the insertion direction, so as to partially define the terminal receptacle compartment, and wherein the terminal member has the projection formed at a location rearward of the second opening.

In this configuration, the projection prevents engagement between the locking piece and the second opening during removal of the terminal member.

In one preferred embodiment, the above connector may be further configured such that a protruding portion is provided at a free end of the elastic locking piece, the protruding portion having a length along the insertion direction that is longer than that of the second opening and shorter than that of the first opening.

This configuration prevents engagement between a free end of the lance piece (locking piece) and the second opening.

In one preferred embodiment, the above connector may be further configured such that, when a front edge of the protruding portion is located at a position of a front edge of the second opening along the insertion direction, the projection abuts the protruding portion.

This configuration prevents engagement between the preluding portion of the locking piece and the second opening.

In one preferred embodiment, the above connector may be further configured such that a rear portion of the projection defines an inclined surface (66A) that slopes rearward toward an upper surface of the terminal member.

In this configuration, when a terminal member is pulled out for removal, the inclined surface of the projection is slidably in contact with the front edge of the elastic locking piece to thereby press the locking piece away from the terminal member. This feature prevents the terminal member from being caught on the protruding portion of the elastic locking piece, thereby facilitating removal of the terminal member from the housing.

Effect of the Invention

A connector of the present invention is configured such that a projection on a terminal member can press a housing lance away from the terminal member, which defines openings therein, thereby preventing the housing lance from being engaged with an opening that is different from the opening with which the housing lance is to be engaged.

BRIEF DESCRIPTION OF THE DRAWINGS

FIG. 9A shows the connector before insertion of a terminal member into a terminal hole, and FIG. 9B shows the connector after insertion of the terminal member into the terminal hole;

FIG. 10A and FIG. 10B (collectively FIG. 10) are explanatory diagrams showing how a inserted terminal is related to a terminal hole, where FIG. 10A shows the terminal member that is inverted upside down is inserted into the terminal hole, and FIG. 10B shows an area defined by a two-dot chain line in FIG. 10A;

FIG. 12A is a cross-sectional view of the connector taken along line XII-XII in FIG. 1, and FIG. 12B is an enlarged view of an area defined by a two-dot chain line in FIG. 12A;

FIG. 19A shows that a terminal member is inserted correctly, and FIG. 19B shows that a terminal member that is inverted upside down is being installed into the terminal hole;

FIG. 20A shows a lance piece in the form of a cantilever beam extending in an opposite direction to the insertion direction, and FIG. 20B shows a lance piece in the form of a double-supported beam;

DESCRIPTION OF THE PREFERRED EMBODIMENT(S)

Embodiments of a connector of the present invention are described in the following with reference to the appended drawings. Various direction-indicating terms (such as up/down, front/rear, and left/right) are used herein as a convenient way to discuss the embodiments, and refer to the corresponding directions illustrated using arrows in FIG. 1.

A connector 10 according to one embodiment of the present invention is used as an electrical connector capable of connecting to another connector or a circuit board 12. In the present embodiment, the connector 10 is so-called card edge socket adapted to receive and connect to a card edge 14, i.e., a rear side of the circuit board 12.

Figure 1:
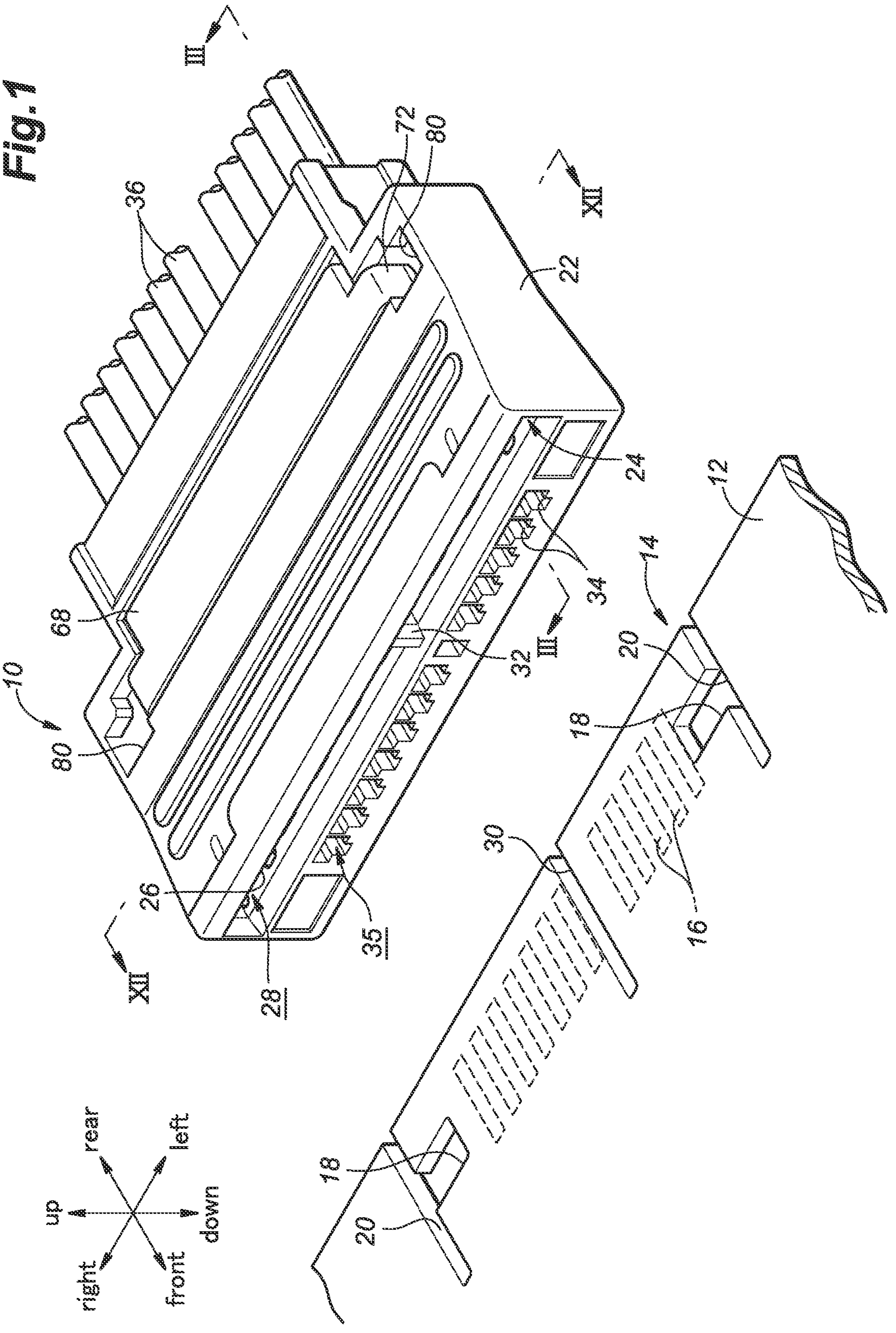
FIG. 1 is a perspective view showing a connector according to one embodiment of the present invention.

As shown in FIG. 1, the card edge 14 has a plurality of board-side terminals 16 and a pair of board-side locking parts 18 provided to lock the connection to the connector 10.

The board-side terminals 16 are metal terminals provided on the underside of the circuit board 12 and are arranged along the rear edge of the circuit board 12. In present embodiment, the board-side terminals 16 on the circuit board 12 are divided into two groups (i.e., left and right groups) located on respective terminal areas of the circuit board 12 and the board-side terminals 16 of each group are equally spaced along the left-right direction. The left and right terminal areas have respective main slits 20 extending in the front-rear direction from the rear edge of the circuit board 12 at left and right lateral positions (positions along the left-right direction), respectively, where the left and right lateral positions are laterally outer positions than respective laterally outermost (i.e., leftmost or rightmost) board-side terminal of the groups. Each board-side locking part 18 is provided as a lateral dent of a corresponding main slit 20 extending inward from the inner edge of the main slit 20, and thus the two board-side locking parts 18 extend closer to each other from the respective main slits. However, the form of a board-side locking part 18 is not limited to a lateral dent of a slit. For example, the board-side locking parts 18 may be recesses or through-holes extending in the up-down direction from the upper or lower surface of the circuit board 12.

Figure 2:
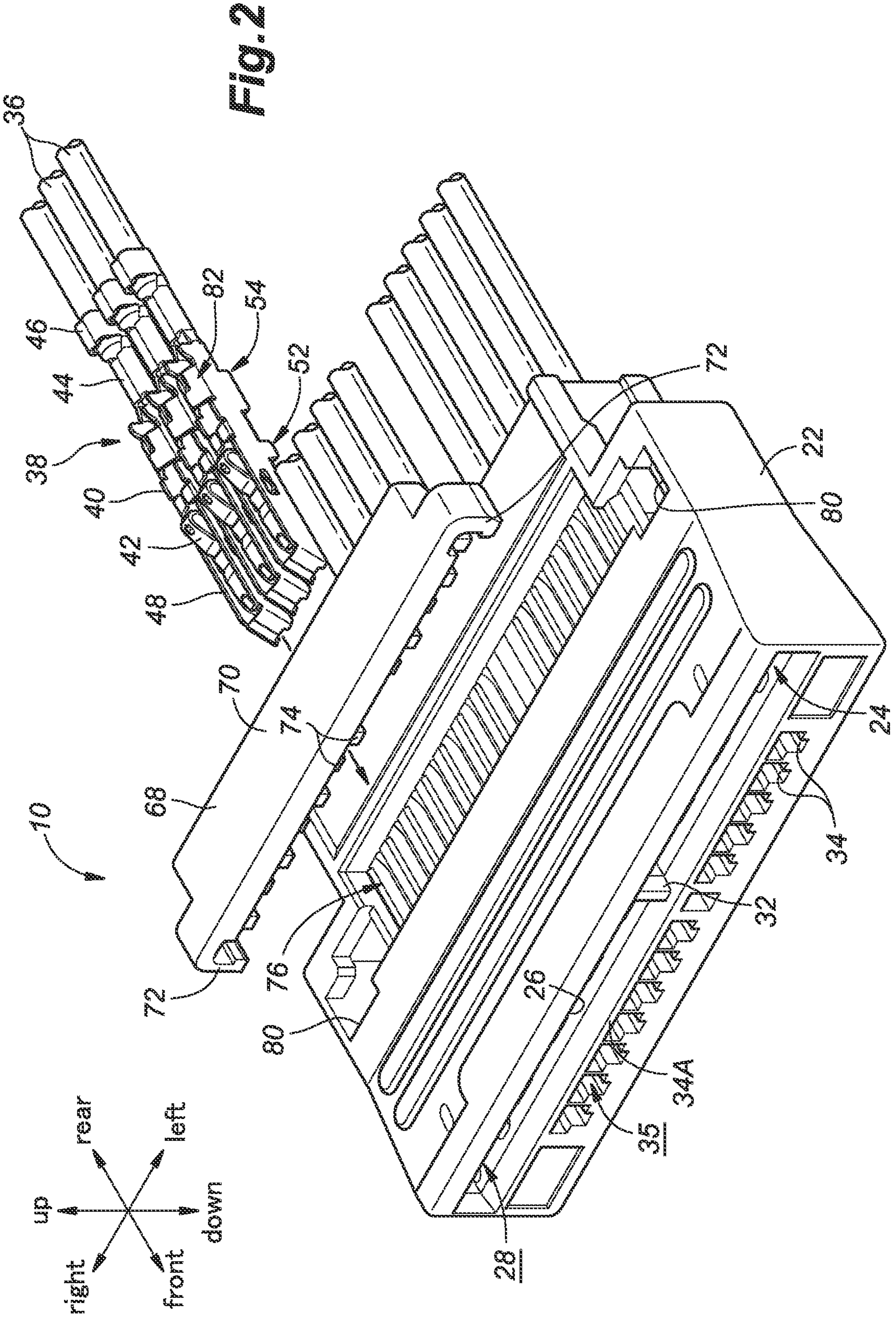
FIG. 2 is an exploded perspective view of the connector of the present embodiment.
Figure 3:
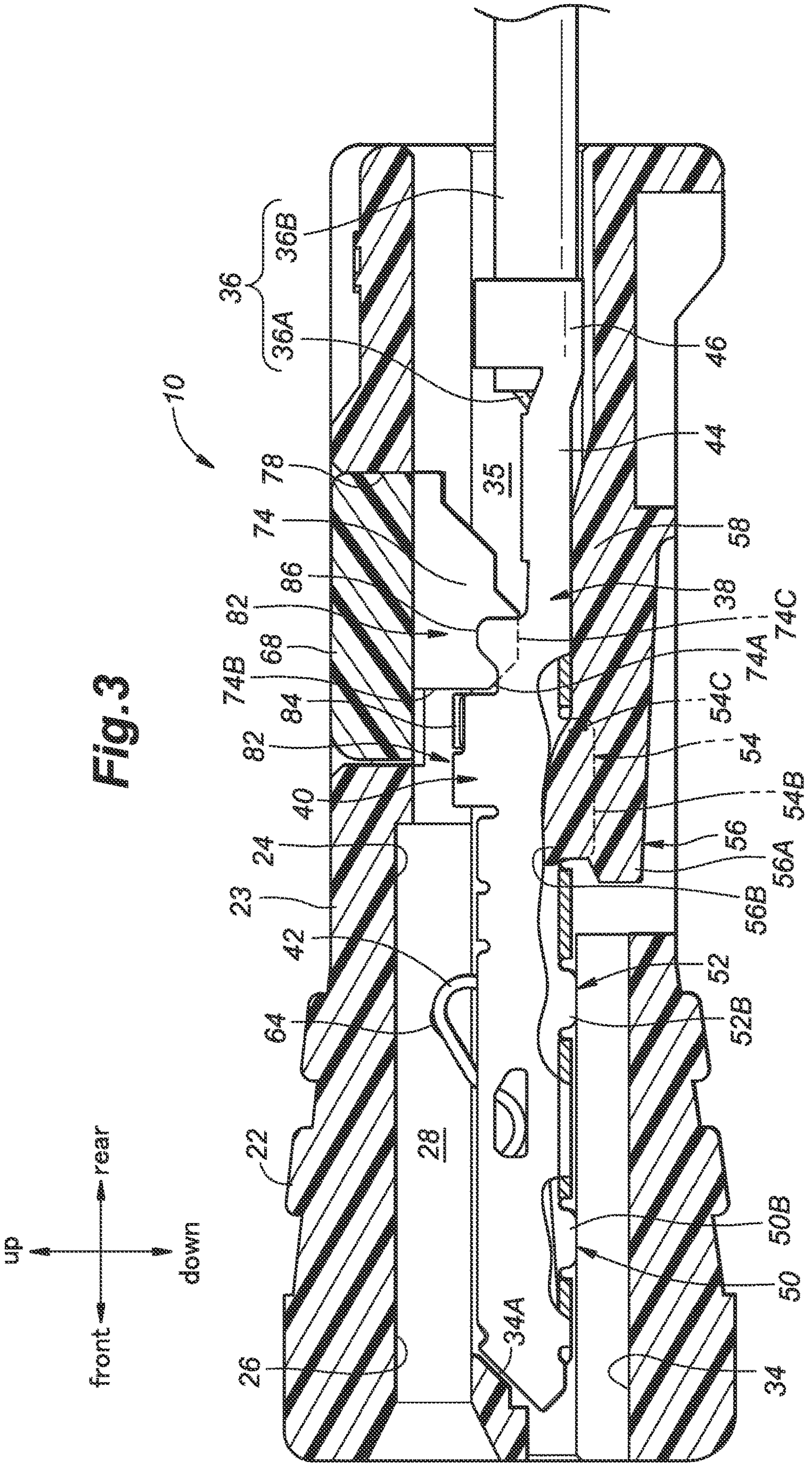
FIG. 3 is a cross-sectional view of the connector shown in FIG. 1 taken along line III-III.

As shown in FIGS. 1 and 2, the connector 10 includes a housing 22 that is a plastic molded component. The housing 22 has a flat shape elongated in the left-right direction. The housing 22 defines an insertion slot recess 24 extending (recessed) rearward from an upper part of the front surface of the housing 22. The insertion slot recess 24 opens at the front end of the housing 22 to define an insertion inlet 26 for insertion of the card edge 14, and defines a receptacle compartment 28 into which the card edge 14 is inserted. As shown in FIG. 3, the insertion slot recess 24 extends from the front end of the housing 22 to about the center of the housing 22 in the front-rear direction.

The housing 22 includes a pair of claw-like latches (not shown) on an inner surface of a wall that defines the insertion slot recess 24 at the locations corresponding to the left and right board-side locking parts 18 of the card edge 14. When the card edge 14 is inserted into the receptacle compartment 28, the latches project into the board-side locking part 18 to thereby couple the card edge 14 to the housing 22.

As shown in FIG. 1, in the present embodiment, the card edge 14 has a center slit 30 extending frontward from the rear edge of the circuit board 12 between the left and right terminal areas for the respective groups of board-side terminals 16. The lateral position (position along the left-right direction) of the center slit 30 is shifted to either side of the main slit 20 in the left-right direction. The insertion slot recess 24 is provided with a partition wall 32 extending in the front-rear direction at a corresponding lateral position to the center slit 30, dividing the receptacle compartment 28 into left and right sub-compartments. When the card edge 14 is inserted into the receptacle compartment 28, the partition wall 32 is inserted into the center slit 30. As the lateral position of the center slit 30 is shifted to either side of main slit 20 (i.e., either left or right side), the card edge 14 that is inverted upside down cannot be inserted into the receptacle compartment 28, which prevents insertion of the card edge 14 upside down.

Figure 4:
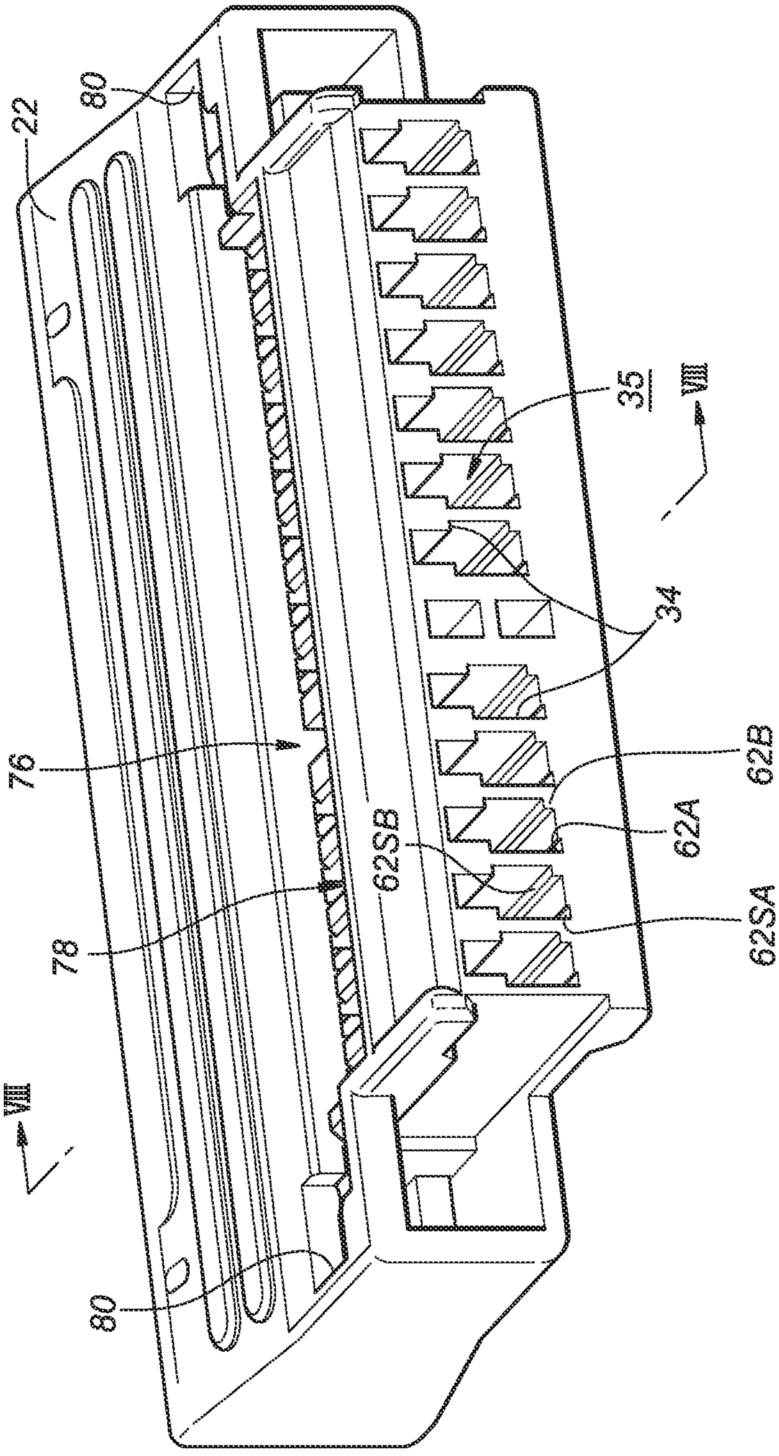
FIG. 4 is a perspective view of a housing viewed from obliquely above.
Figure 5:
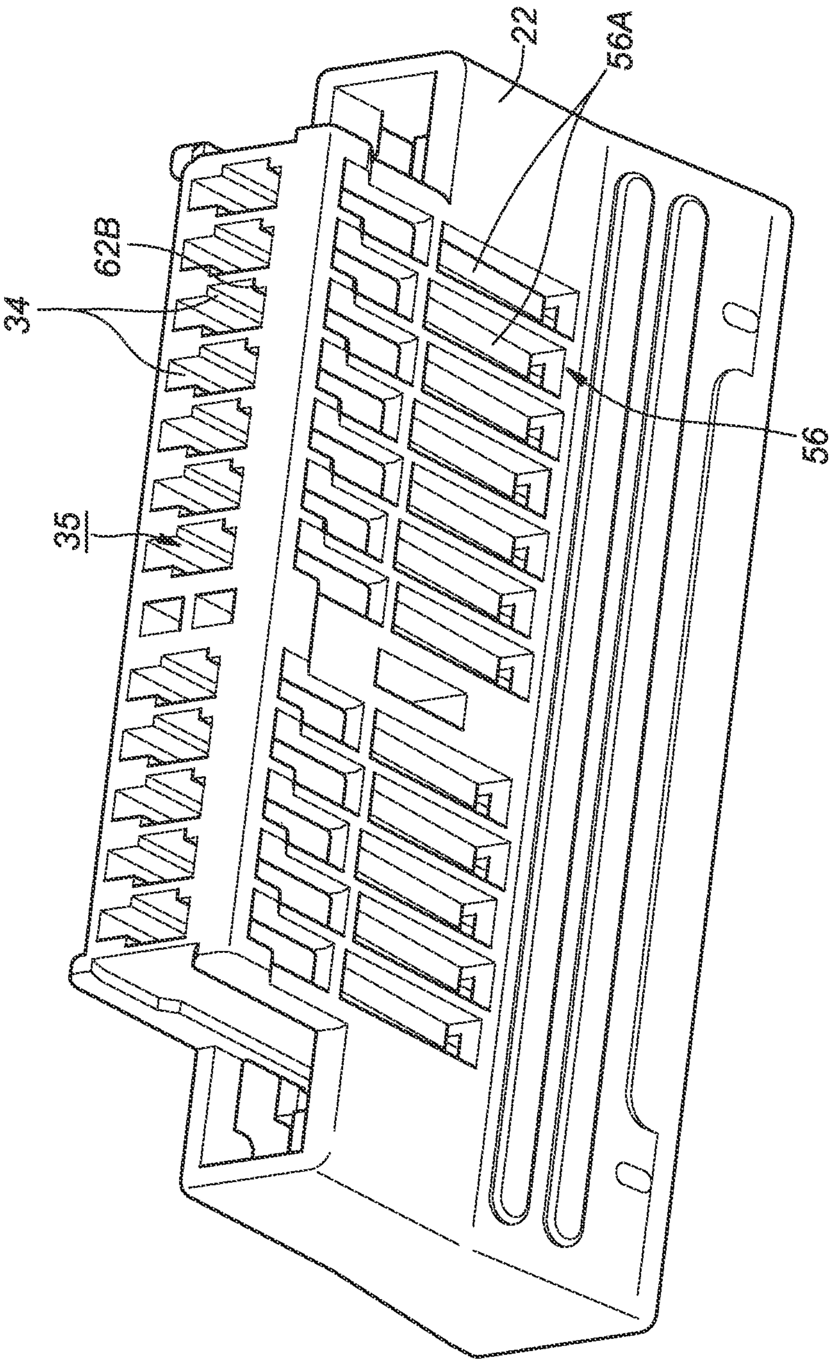
FIG. 5 is a perspective view of the housing when viewed from below.

As shown in FIGS. 3, 4, and 5, the housing 22 has a plurality of terminal holes 34 extending therethrough in the front-rear direction below the receptacle compartment 28. As shown in FIG. 3, each terminal hole 34 extends through the housing 22 to define a terminal receptacle compartment 35 extending in the front-rear direction. In the present embodiment, as shown in FIG. 2, the terminal holes 34 are provided in the lower part of the housing 22, and arranged in a row along the left-right direction. As shown in FIG. 3, a front part of each terminal hole 34 and a rear part of the insertion slot recess 24 are communicably connected to each other in the up-down (vertical) direction.

As shown in FIG. 2, each terminal hole 34 receives a terminal member that is electrically connected to a sheathed cable 36 and adapted to be inserted into the terminal hole. All the terminal members 38 have the same shape, each extending in a predetermined direction, and consisting primarily of a folded metal sheet material formed by a press-forming process. As shown in FIG. 3, each terminal member 38 is inserted and attached to a terminal hole 34 from the rear toward the front. In other words, the frontward direction is an insertion direction of a terminal member 38 (i.e., a direction in which a terminal member 38 is inserted into a terminal hole 34).

Figure 6:
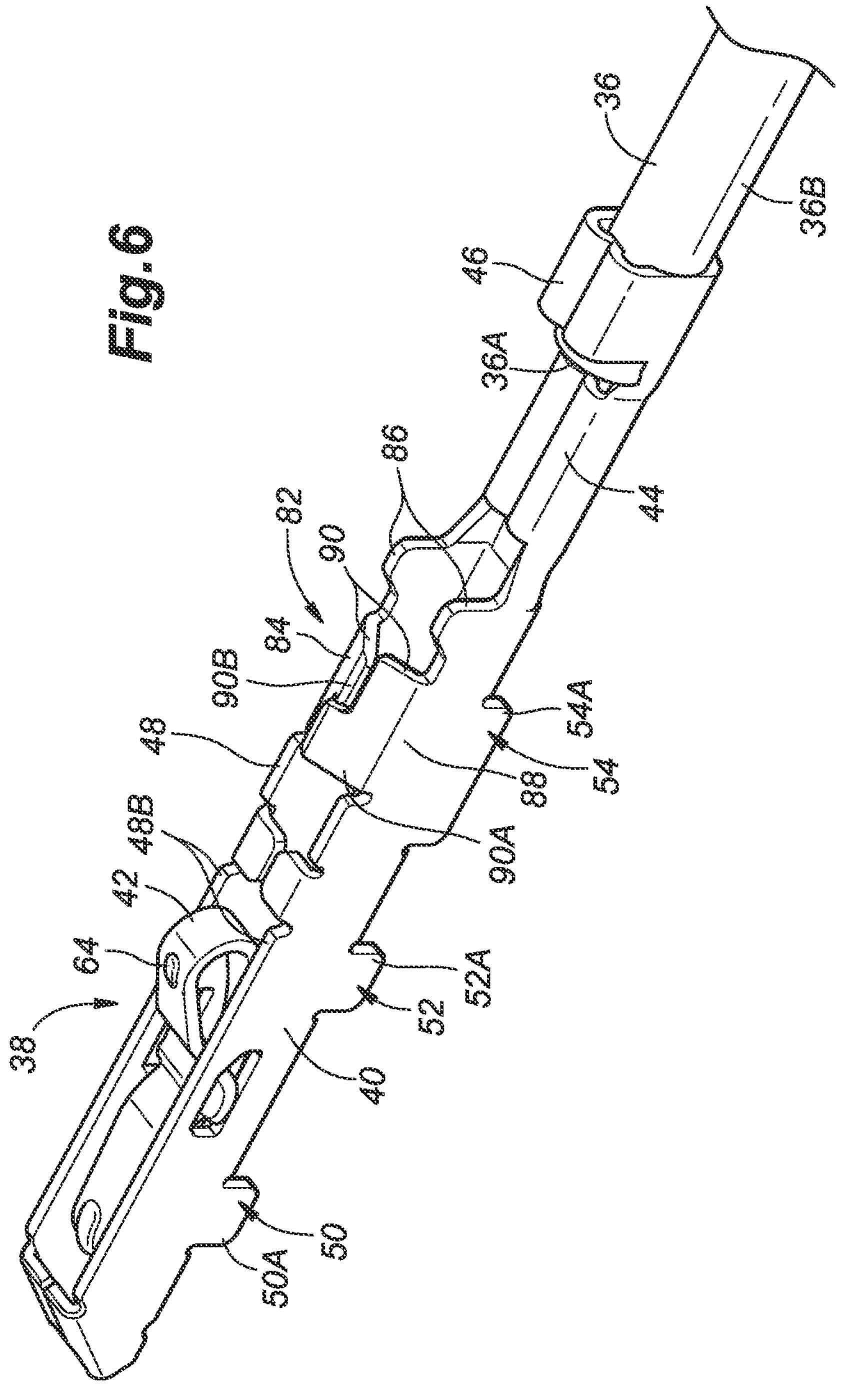
FIG. 6 is a perspective view of a terminal member viewed from obliquely above.
Figure 7:
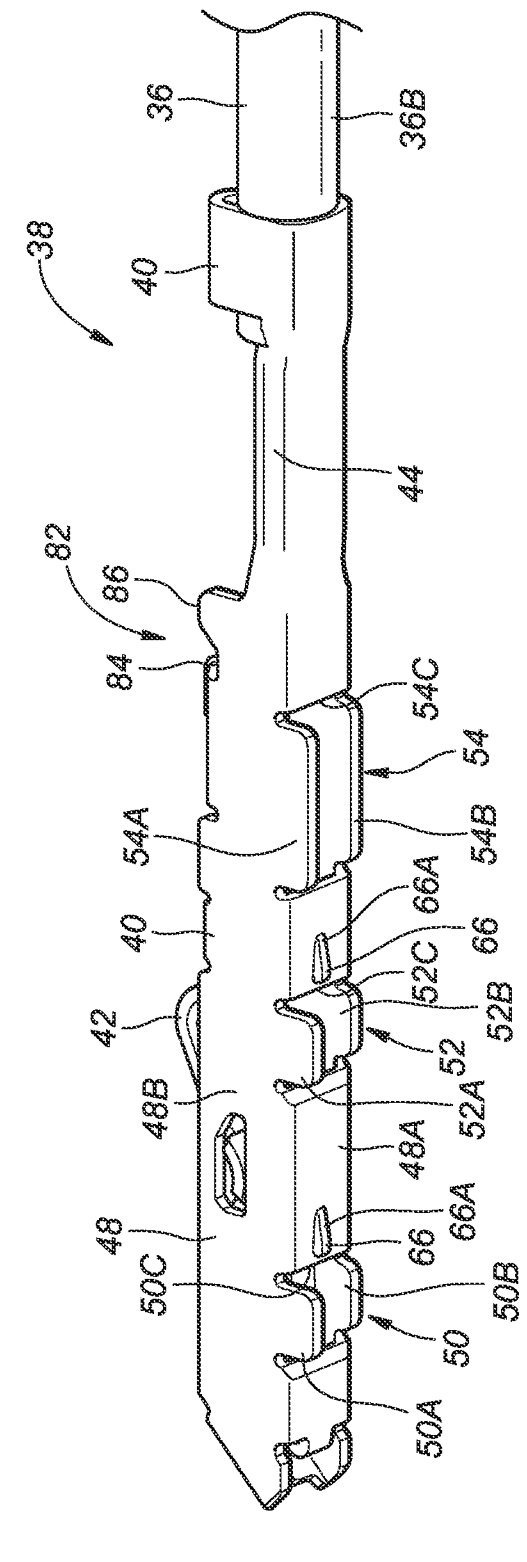
FIG. 7 is a perspective view of the terminal member viewed from below.

As shown in FIGS. 6 and 7, a terminal member 38 includes a terminal body 40 extending in the front-rear direction; a contact piece 42 connected to a front end part of the terminal body 40, and a core wire barrel 44 and a wire sheath barrel 46 formed at a rear part of the terminal body 40. The core wire 36A and its wire sheath 36B of a sheathed cable 36 are crimped to the core wire barrel 44 and the wire sheath barrel 46, respectively.

The terminal body 40 includes a gutter-shaped portion 48 having a generally U-shaped cross-sectional profile 48 and extending in the front-rear direction. The gutter-shaped portion 48 has a bottom wall 48A extending in the front-rear direction and side walls 48B extending upwardly from the left and right edges of the bottom wall 48A, respectively, and has a U-shaped cross section that opens upward. Preferably, the width of the bottom wall 48A is different from the height of the side walls 48B when viewed from the front or rear of a gutter-shaped portion 48. In the gutter-shaped portion 48 of the present embodiment, the vertical height of the side wall 48B is longer than the horizontal width of the bottom wall 48A.

As shown in FIG. 7, the bottom of a gutter-shaped portion 48 is provided with stabilizers 50 and 52 for stabilizing the posture of a terminal member 38 during insertion, and an engagement portion 54 for locking the terminal body 40 to the housing 22. The engagement portion 54 is located rearward of the stabilizers 50, 52. In the present embodiment, the gutter-shaped portion 48 has bottom side elements consisting of two stabilizers 50, 52 and one engagement portion 54. Each of the bottom side elements 50, 52, and 54 has a pair of legs 50A (50B), 52A (52B), and 54A (52B) and a corresponding opening 50C, 52C, and 54C formed between the pair of legs 50A (50B), 52A (52B), and 54A (52B), where each pair of legs consist primarily of a pair of raised pieces formed by cutting and bending parts of the bottom wall downward so as to form substantially right angled pieces along the edges of both sides. In other words, each pair of legs 50A (50B), 52A (52B), and 54A (54B) are a pair of plate-shaped pieces which protrude along the left and right side edges of a corresponding opening 50C, 52C, and 54C, such that their inner surface facing each other along the left-right direction (width direction) with a corresponding opening 50C, 52C, and 54C, formed therebetween. Hereafter, the opening 54C of an engagement portion 54 is described as "an engagement opening" 54C (first opening), and the openings 50C and 52C of stabilizers 50 and 52 are described as "stabilizer openings" 50C and 52C (second openings), respectively. The stabilizer openings 50C and 52C are located on the front side of the engagement opening 54C, i.e., located frontward of the engagement opening 54C along the insertion direction.

Each pair of the legs 50A (50B), 52A (52B), and 54A (52B) are comprised primarily of a pair of raised pieces formed by cutting and bending parts of the bottom wall of a corresponding opening among the engagement opening 54C, and the stabilizer openings 50C and 52C. This feature eliminates the need for the process steps of cutting and removing portions of a bottom wall to form the engagement opening 54C and the stabilizer openings 50C and 52C or attaching separate pieces of legs 50A (50B), 52A (52B), and 54A (52B) to the terminal member, which means that an engagement portion 54 and stabilizers 50 and 52 can be easily formed in manufacturing of a connector.

As shown in FIG. 7, the left legs 50A, 52A, and 54A of the stabilizers 50 and 52 and the engagement portion 54 have a same height (projection height) from the lower edge of the gutter-shaped portion 48 (Hereafter, a "left piece height" $A_L$ refers to a vertical distance between the lower edge of the left legs 50A, 52A, and 54A and the lower edge of the gutter-shaped portion 48.), while the right legs 50A, 52A, and 54A of the stabilizers 50 and 52 and the engagement portion 54 have a same height (projection height) from the lower edge of the gutter-shaped portion 48. (Hereafter, a "right piece height" $A_R$ refers to a vertical distance between the lower edge of the right legs 50B, 52B, and 54B and the lower edge of the gutter-shaped portion 48.) The left piece height $A_L$ and the right piece height $A_R$ differ from each other. In the present embodiment, the left piece height $A_L$ is greater than the right piece height $A_R$. As a result, the gutter-shaped portion 48 has the left and right walls 48B having different vertical lengths. Specifically, a length $B_L$ from the top edge of the left side wall 48A to the bottom edge of any of the left legs 50A, 52A, 54A is different from (greater than) a length $B_R$ from the top edge of the right side wall 48B to the bottom edge of any of the right legs 50B, 52B, 54B. (Hereafter, the lengths $B_L$ and $B_R$ are described as "left terminal body vertical length" and "right terminal body vertical length", respectively.) The left terminal body vertical length $B_L$ is greater than the right terminal body vertical length $B_R$.

Figure 8:
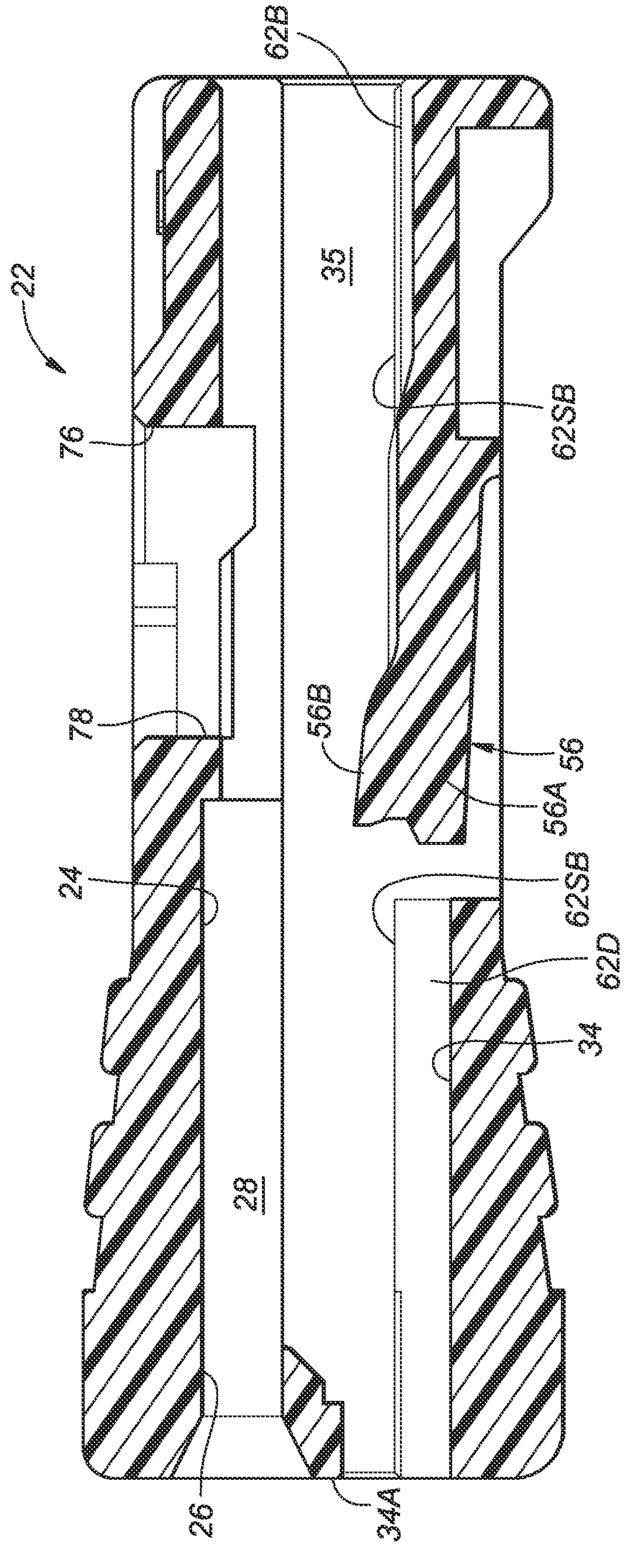
FIG. 8 is a cross-sectional view of the connector shown in FIG. 4 taken along line VIII-VIII.

As shown in FIGS. 3, 5, and 8, the housing 22 includes housing lance portions 56 for respective terminal holes 34, and each housing lance portion is adapted to secure a terminal member 38 to a corresponding terminal hole 34. In the present embodiment, each housing lance portion 56 includes a lance piece 56A integrally formed with the housing 22 by forming a U-shaped notch (having a U-shape opening rearward) in a wall defining the underside of a corresponding terminal hole 34. The lance piece 56A is a cantilever piece that extends out frontward from a lower part of the rear portion of the housing 22. A lance piece 56A provided at each terminal hole 34 defines a lower rear end portion of a corresponding terminal receptacle compartment 35. In other words, the housing body 23 of the housing 22 (see FIG. 3) and the lance pieces 56A cooperatively define the terminal holes 34. Each lance piece 56A is a cantilever piece that is coupled to the housing body 23 at its rear end and extends out frontward. As shown in FIG. 8, a lance piece 56A is bent upward more with the increasing distance from its rear end toward the front when no load is applied thereto.

As shown in FIG. 3, when a terminal member 38 is completely inserted into a terminal hole 34 (i.e., in an assembled state), a free end (front end) of a lance piece 56A is inserted into and elastically engaged with an engagement opening 54C. In other words, the lance piece 56A functions as an elastic locking piece for locking a terminal member 38 to a terminal hole 34. Thus, the terminal member 38 is prevented from moving in the front-rear direction out of the housing 22, and the terminal member 38 is positioned and secured in a corresponding terminal receptacle compartment 35 of the housing 22.

As shown in FIGS. 3 and 8, the free end of the lance piece 56A has a protruding portion 56B that protrudes upward. The front-rear length of the protruding portion 56B is longer than that of the stabilizer openings 50C and 52. This feature prevents the protruding portion 56B from being inserted into the stabilizer apertures 50C and 52C, and prevents the free end of the lance piece 56A being engaged with the stabilizer openings 50C and 52C, thereby avoiding incorrect assembly of a terminal member 38. The front-rear length of the protruding portion 56B is slightly shorter than that of the engagement opening 54C. This feature facilitates insertion of the protruding portion 56B into the engagement opening 54C, thereby ensuring that the terminal member 38 is properly secured to the housing 22.

Figure 9B:
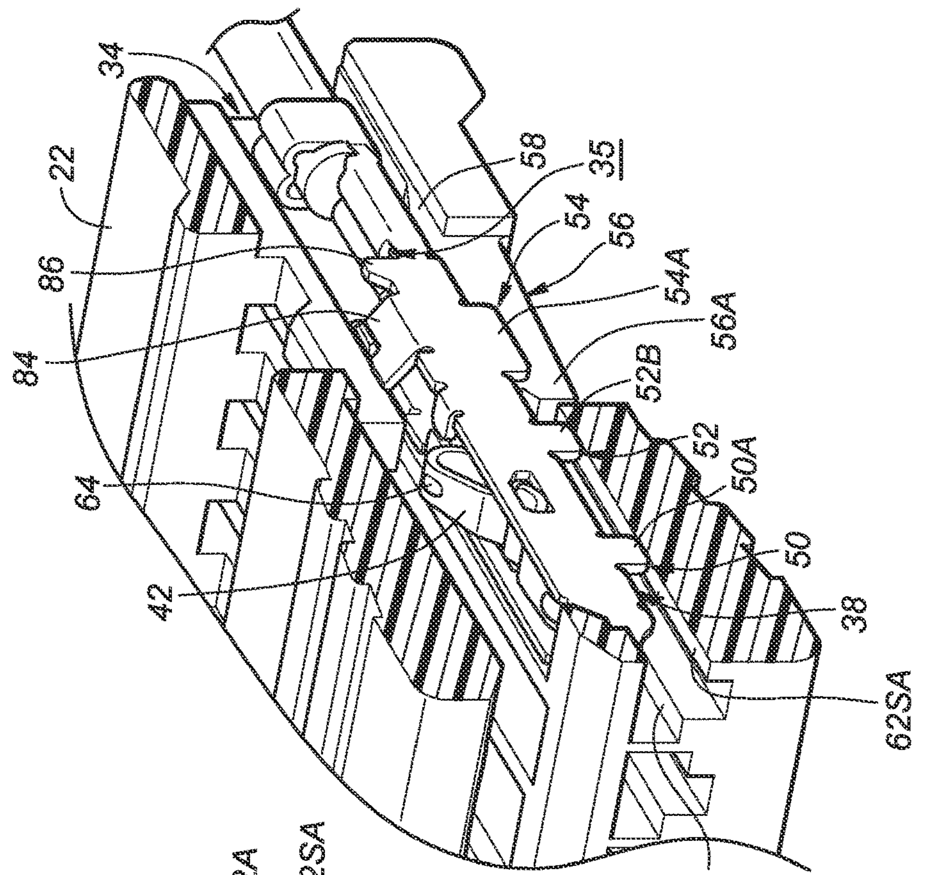
FIGS. 9A and 9B (collectively FIG. 9) are perspective cross-sectional views of a connector, where
Figure 9A:
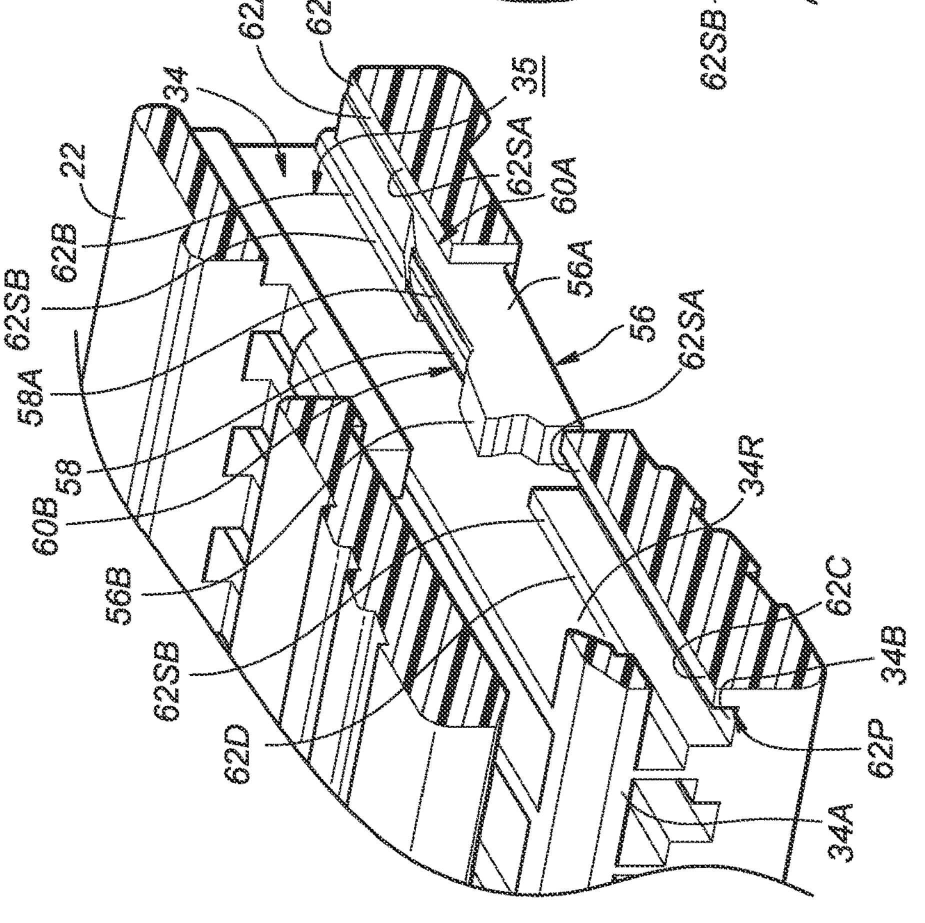

As shown in FIG. 9A, a lance piece 56A has a ridge 58 protruding upward and extending in the front-rear direction. The ridge 58 extends frontward from about the center of the top surface of the lance piece 56A and reaches a point near the front edge of the lance piece 56A. Left and right gaps 60A (60B) are defined between the ridge 58 and the left and right side walls 34L, 34R defining the left and right side surfaces of the terminal holes 3, respectively (see FIG. 12). The width of the gaps 60A (60B) corresponds to the lateral thickness (thickness in the left-right direction) of the legs 50A (50B), 52A (52B), 54A (54B). The lateral width of the ridge 58 corresponds to the distance between each pair of opposite legs 50A (50B), 52A (52B), 54A (54B) in the left-right direction (see FIG. 12). In the present embodiment, in order to increase the stiffness of the lance piece 56A, the lateral width of the ridge 58 is approximately equal to the lateral spacing between each pair of opposite legs 50A (50B), 52A (52B), 54A (54B). However, the lateral width of the ridge 58 is not limited to this width and may be smaller than the lateral distance between the two opposite legs 50A (50B), 52A (52B), 54A (54B).

As shown in FIG. 9A, the bottom wall 34B of each terminal hole 34 defines an inclined top surface at about the lateral center thereof that slopes down towards the front, thereby forming a passage 62P extending from the front surface of the housing 22 to reach the front surface of the lance piece 56A. The passage 62P is used for pulling out a mold for forming the lance piece 56A.

In the present embodiment, the top surface of the bottom wall 34B of a terminal hole 34 defines a groove 62A extending along the left edge of the bottom wall 34B near the rear end thereof. The top surface of the bottom wall 34B of a terminal hole 34 also defines a rear right curb 62B extending along the right edge of the bottom wall 34B near the rear end thereof. The rear right curb 62B is a raised part extending along the right edge of the bottom wall 34B near the rear end thereof. The right edge of the rear right curb 62B connects to a side wall 34R (see also FIG. 12), which defines the right side of the terminal hole 34.

A front left curb 62C extends along the left edge of the top surface of the bottom wall 34B of the terminal hole 34 near the front end thereof. The front left curb 62C is a raised part extending along the left edge of the bottom wall 34B near the rear end thereof. The left edge of the front left curb 62C connects to a side wall 34L (see also FIG. 12), which defines the left side of the terminal hole 34. A front right curb 62D extends along the right edge of the bottom wall 34B near the front end thereof. The front right curb 62D is a raised part extending along the right edge of the bottom wall 34B near the front end thereof. The right edge of the front right curb 62D connects to a side wall 34R (see also FIG. 12), which defines the right side of the terminal hole 34.

Both the bottom surface of the groove 62A and the top surface of the front left curb 62C extend in the front-rear direction. The bottom surface of the groove 62A and the top surface of the front left curb 62C extend at a same vertical position (position along the up-down direction) to form a horizontal surface 62SA continuously extending in the front-rear direction.

Both the top surface of the rear right curb 62B and the top surface of the front right curb 62D extend in the front-rear direction. The top surface of the rear right curb 62B and the top surface of the front right curb 62D extend at a same vertical position to form a horizontal surface 62SB continuously extending in the front-rear direction.

Figure 12B:
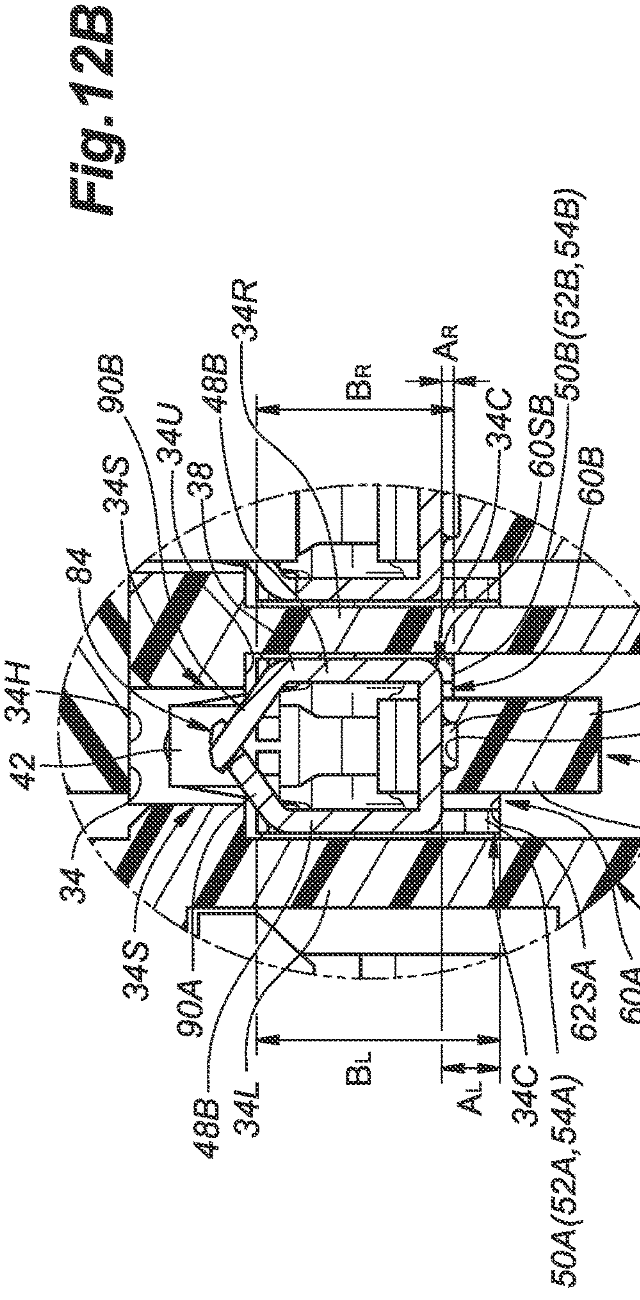
FIGS. 12A and 12B (collectively FIG. 12) are cross-sectional views of the connector shown in FIG. 1, where

The horizontal surface 62SA on the left side is located at the vertical position corresponding to the piece height of the left leg 50A, 52A, 54A, and the horizontal surface 62SB on the right side is located at the vertical position corresponding to the piece height of the right leg 50B, 52B, 54B (see FIG. 12B). More specifically, the distance between the horizontal surface 62SA on the left side and the bottom surface of the top wall of the terminal hole 34 is approximately equal to the left terminal body vertical length $B_L$, and the distance between the horizontal surface 62SB on the right side and the bottom surface of the top wall of the terminal holes 34 is approximately equal to the right terminal body vertical length $B_R$.

A terminal member 38 is attached to a terminal hole 34 by inserting the tip of the terminal body 40 into the terminal hole 34 from the rear and pushing the terminal member 38 frontward along the terminal holes 34 until its tip abuts against the front wall 34A of the terminal hole 34.

As shown in FIG. 9B, when a terminal member 38 is inserted into a terminal hole 34, the left legs 50A, 52A, and 54A slide on the horizontal surface 62SA, and the right legs 50B, 52B, and 54B slide on the horizontal surface 62SB. In other words, the horizontal surfaces 62SA (62SB) on the left and right are slide surfaces on which the left and right legs 50A (50B), 52A (52B), and 54A (54B) can slide, respectively, during insertion of the terminal member 38.

In this configuration, in which a terminal member 38 is provided with pairs of legs 50A (50B), 52A (52B), and 54A (54B) which slide on the corresponding horizontal surfaces 62SA (62SB), the sliding contact area between the terminal member 38 and the top surface of the bottom wall 34B of the terminal hole 34 is decreased, compared to cases of a terminal member 38 having a square cylindrical shape without legs. This decrease in the sliding contact area leads to, for example, a decrease in the frictional force between the terminal member 38 and the top surface of the bottom wall 34B of the terminal hole 34 during insertion.

A terminal member 38 with legs 50A (50B), 52A (52B), and 54A (54B) has the lower side edges (i.e., the lower outer side edges of the respective legs 50A (50B), 52A (52B), and 54A (54B)) that are right-angled. In the case of a terminal member without legs 50A (50B), 52A (52B), and 54A (54B), the terminal member formed by bending a metal sheet should have rounded lower outer side edges with a certain curvature. In other words, a terminal member 38 with legs 50A (50B), 52A (52B), and 54A (54B) has smaller gaps between its lower side edges and corners 34C defined by the horizontal surfaces 62SA (62SB) and the inner surfaces of side walls 34L (34R) of a terminal hole 34, than a terminal member without legs 50A (50B), 52A (52B), 54A (54B). As a result, the terminal member 38 with legs is less likely to fall sideways to the left or right; that is, the posture of the terminal member 38 is stabilized during insertion.

As a terminal member 38 is pushed frontward along a terminal hole 34, the bottom wall 48A of the gutter-shaped portion 48 of the terminal member 38 reaches the ridge 58 and slides along the top surface thereof. In addition, as shown in FIG. 9B, while the terminal member 38 is pushed and moved frontward, the ridge 58 is positioned between the respective pairs of left and right legs 50A (50B), 52A (52B) and 54A (52B), and the insertion movement of the terminal member 38 is guided in the insertion direction (i.e. frontward). The legs 50A (50B), 52A (52B), and 54A (52B) are introduced into the gaps 60A (60B) between the ridge 58 and the respective side walls of the terminal holes 34, which restricts lateral movement of the terminal member 38, ensuring that the insertion movement of the terminal member 38 is guided in the front-rear direction. In other words, the ridge 58 serves as a rail and the lance piece 56A functions as a guide member to guide the insertion movement of the terminal member 38 by using the legs 50A (50B), 52A (52B), and 54A (52B) as guided members. In order to ensure that the insertion movement of the terminal member 38 is guided in the front-rear direction, the legs 50A (50B), 52A (52B), and 54A (52B) located in the gaps 60A (60B) are preferably in sliding contact with the respective side surfaces of the ridge 58.

In the present embodiment, the horizontal surfaces 62SA (62SB), which are slide surfaces, need to be at heights that match the legs 50A (50B), 52A (52B), and 54A (52B) on the respective sides, as shown in FIG. 10B. Thus, the groove 62A and the rear right curb 62B are located near the rear end of the bottom wall 48A of a terminal hole 34, respectively. As a result, the bottom part of the terminal hole 34 has a staircase-shaped cross-section at the rear end, in which the vertical position (i.e., height) of the bottom surface increases stepwise to the right.

When the top surface of the bottom wall 34B of the terminal hole 34 has a staircase cross-sectional shape in which the height of the surface increases stepwise to the right as described above, a terminal member 38 in which the projection height of the right legs 50B, 52B, and 54B is equal to that of the left legs 50A, 52A, and 54A (as shown by double-dotted line in FIG. 10B) can be inserted in an upside-down state. However, in the present embodiment, the right legs 50B, 52B, and 54B have a greater projection height than that of the left legs 50A, 52A, and 54A, and when the terminal member 38 is inserted into the terminal hole 34 in an upside-down state (as shown in solid line in FIG. 10B), the right legs 50B, 52B, 52B catch on the rear end of the terminal hole 34, which prevents insertion of the terminal member 38 into the terminal hole 34. In this way, this feature of different projection heights blocks insertion of a vertically inverted terminal member 38 into a terminal hole, preventing incorrect installation of the terminal member 38.

As shown in FIG. 6, a contact piece 42 of a terminal member is a bent piece folded rearward from the front end of the lower (bottom) portion 48 of the gutter-shaped portion 48 and has spring properties that allow elastic deformation in the vertical direction. A contact 64 is formed at a free end of the contact piece 42 and projects upward. The contact 64 protrudes upward from the gutter-shaped portion 48 and can contact a receptacle compartment 28 when no external load is applied to the contact piece 42. When a card edge 14 is inserted into the receptacle compartment 28, each contact 64 contacts a corresponding board-side terminal 16 with a predetermined contact pressure. As a result, board-side terminals 16 of a circuit board 12 are in contact with and thus electrically connected to the respective core wires 36A of cables.

As shown in FIG. 12B, a recess 34H recessed upward is formed in the lower surface of the upper wall 34U of a terminal hole 34 so as to accommodate a contact piece 42. As a result, beam-shaped guides 34S are formed on both the left and right edges of the upper part of the terminal hole 34, respectively. When a terminal member 38 is inserted into the terminal hole 34, the contact piece 42 of the terminal member is accommodated in the recess 34H. Furthermore, the beam-shaped guides 34S restrict the lateral movement of the contact piece 42 and guide the movement of the terminal member 38 in the insertion direction. The left and right side walls 34L and 34R of a terminal hole 34 also restrict the lateral movement of a terminal member 38 during insertion. Moreover, the horizontal surfaces 62SA (62SB) restrict the downward movement of a terminal member 38 during insertion and guide the movement of the terminal member 38 in the insertion direction.

As shown in FIG. 7, projections 66 are provided on the underside of a gutter-shaped portion 48. Each of the projections 66 prevents at least a part of a lance piece 56A from being inserted into and engaged with the stabilizer openings 50C, 52C during insertion or removal of a terminal member 38. More particularly, two projections 66, which are provided on the underside of the gutter-shaped portion 48, project downward at locations on the rear side of the respective stabilizer openings 50C and 52C, more specifically, at locations rearward of and near the rear edges of the stabilizer openings 50C and 52C, respectively. One of the projections 66 is located between the two stabilizer openings 50C, 52C, and the other is located between the rear stabilizer opening 52C and the engagement opening 54C. Preferably, the distance between the front edge of each of the stabilizer openings 50C and 52C and that of a corresponding projection 66 is shorter than the front-rear length of the protruding portion 56B. In the present embodiment, the projections 66 are formed by embossing of a material at corresponding points to proper locations in the underside of the gutter-shaped portion 48.

The rear portion of a projection 66 defines an inclined surface 66A that slopes downward to the front (i.e., slopes away from the terminal member 38 toward the front). In the present embodiment, each projection 66 is provided rearward of a corresponding one of the stabilizer openings 50C and 52C. The width (left-right length) of a projection 66 is smaller than the width of a terminal member 38. Each projection 66 extends along the front-rear direction at about the lateral center on the underside of the gutter-shaped portion 48.

In the present embodiment, a rear portion of the protruding portion 56B of the ridge 58 defines a groove 58A (see FIG. 9A) that is recessed from the top surface at about the lateral center of the ridge 58. The groove 58A, which extends in the front-rear direction, should have such a depth that, when the bottom surface of gutter-shaped portion 48 contacts the top surface of the ridge 58, the groove 58A can receive the projections 66 (see FIG. 12). This feature allows a projection 66 to be received in the groove 58A when the projection 66 passes over a position rearward of the protruding portion 56B of the ridge 58. This feature also prevents the rear portion of the protruding portion 56B of the ridge 58 from being pushed downward by the projection, thereby allowing the gutter-shaped portion 48 to pass smoothly over the ridge 58.

Figure 11:
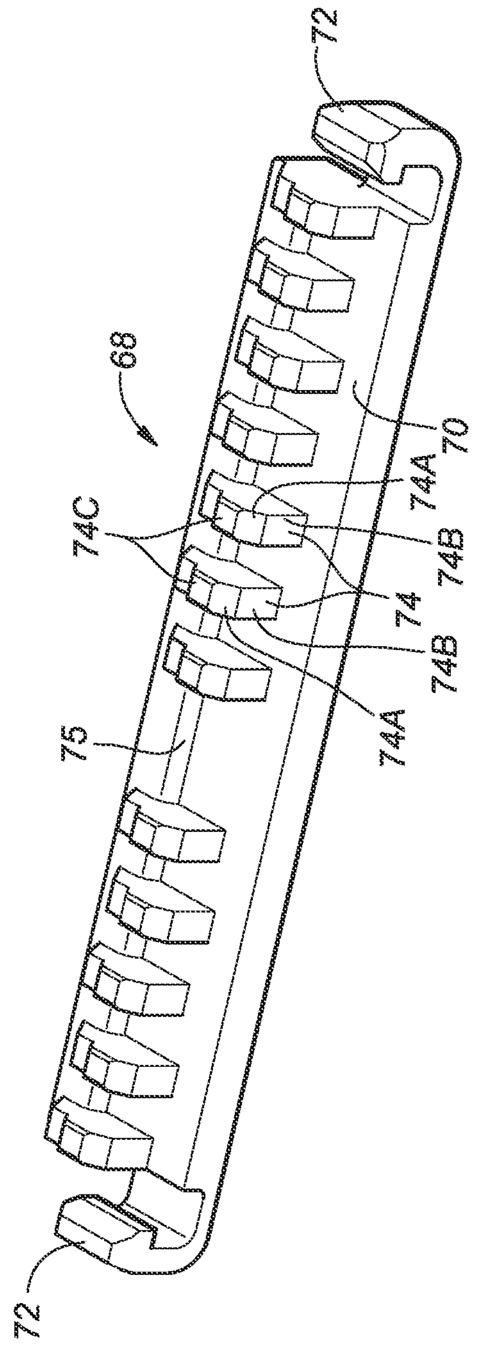
FIG. 11 is a perspective view showing a retainer that is inverted upside down (i.e., viewed from below)

As shown in FIG. 3, in the present embodiment, the connector 10 includes a retainer 68, which is a molded plastic component for locking the top of a terminal member 38 to the housing 22. As shown in FIG. 11, the retainer 68 includes a plate-shaped retainer body 70 extending in the left-right direction, a pair of retainer attachment claws 72 protruding downward from the left and right ends of the retainer body 70, and a plurality of terminal locking parts 74 protruding downward at locations between the two retainer attachment claws 72.

Figure 12A:
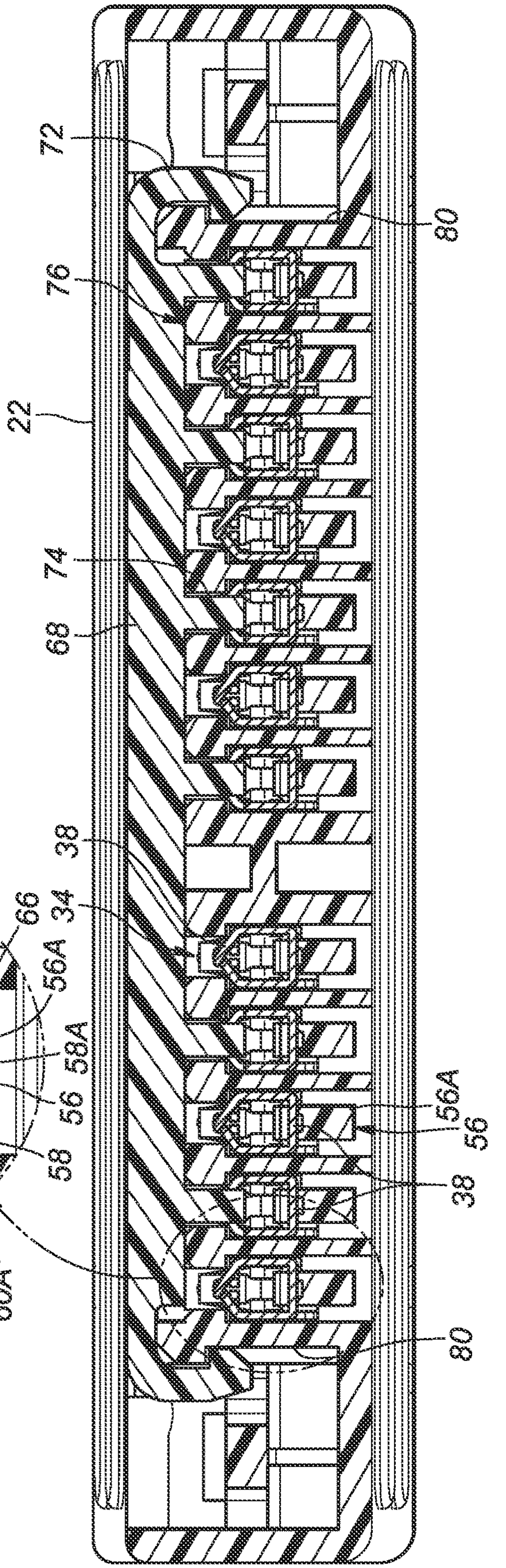

As shown in FIGS. 1 and 12, the top rear part of the housing 22 defines a retainer receptacle recess 76 configured to accommodate a retainer 68. The retainer receptacle recess 76 is communicably connected to the terminal holes 34 via respective communication holes 78 vertically extending through the housing. Left and right retainer engagement recesses 80 are defined at the left and right ends of the retainer receptacle recess 76, respectively, each retainer engagement recess being recessed downward. The retainer attachment claws 72 are inserted into and secured in the retainer recesses 80 defined in the housing, so that the retainer 68 is coupled to the housing 22.

Figure 13:
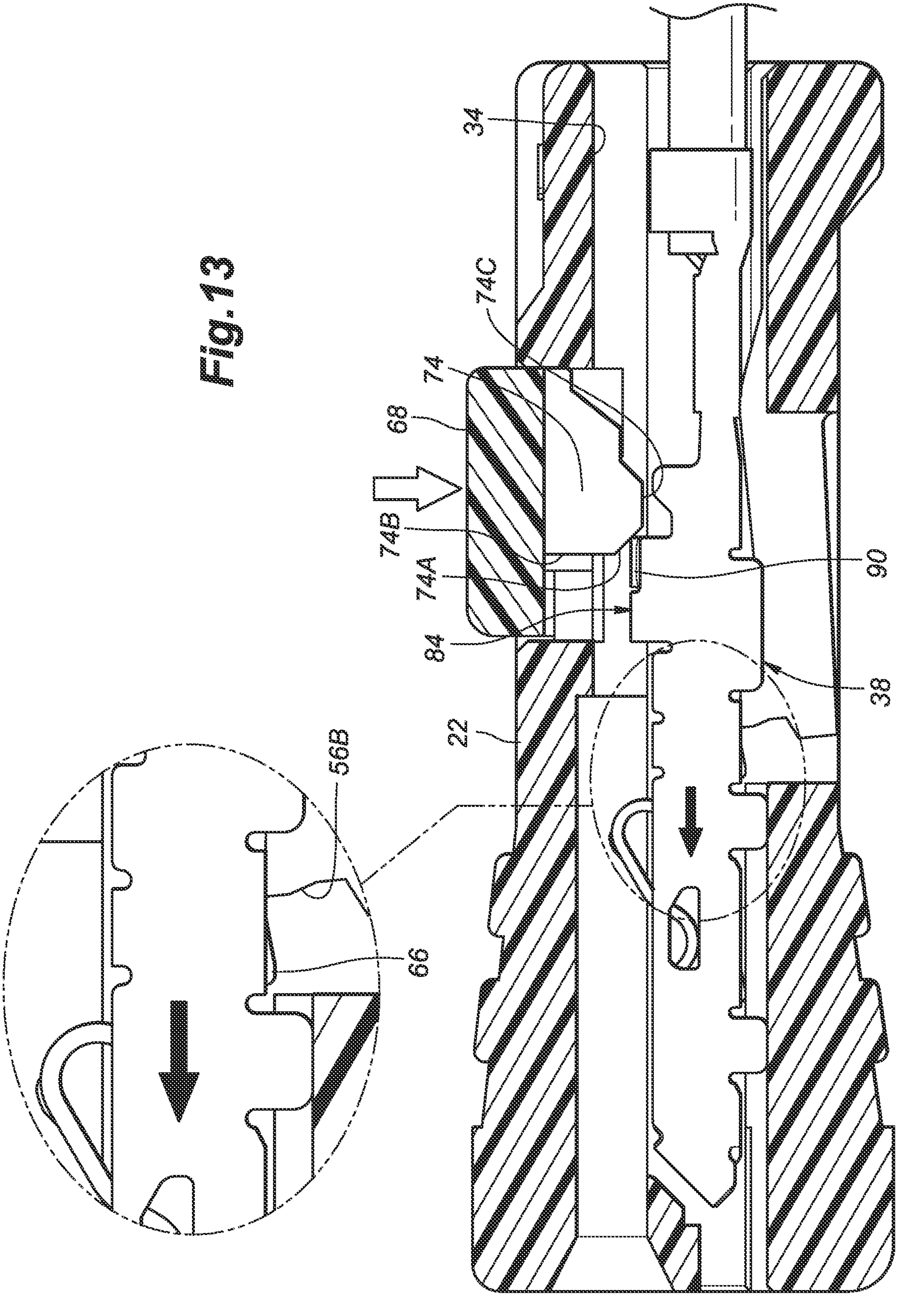
FIG. 13 is an explanatory diagram showing how a terminal member that is not completely inserted into a terminal hole is moved when a retainer is inserted, along with an enlarged view of an area defined by a two-dot chain line.

As shown in FIG. 11, the terminal locking parts 74 are plate-shaped, each having opposing side surfaces. The terminal locking parts 74 are arranged in a row along the left-right direction on the underside of the retainer body 70. As shown in FIG. 3, when a retainer 68 is attached to a housing 22, the terminal locking parts 74 are positioned at corresponding locations to the respective terminal holes 34, and project into the communication holes 78 to reach the interior of the respective terminal holes 34. As shown in FIGS. 3 and 13, each terminal locking part 74 has an inclined surface 74A sloping upward to the front, a front surface 74B extending upward from the front edge of the inclined surface 74A, and a horizontal lower surface 74C extending rearward from the rear edge of the inclined surface 74A. The inclined surface 74A is located at the front lower edge of the terminal locking part 74. The front surface 74B faces frontward and the horizontal lower surface 74C faces downward.

As shown in FIG. 11, in the present embodiment, the underside of a retainer body 70 defines a rib 75 extending in the left-right direction. The rib 75 is connected to all the terminal locking parts 74 arranged in a row along the left-right direction. This feature increases the stiffness of a retainer 68.

As shown in FIGS. 3, 6, and 7, the rear end portion of a gutter-shaped portion 48 is provided with a retainer engagement part 82. The retainer engagement part 82 is provided at a location of a corresponding communication hole 78, and configured to engage with the retainer to secure it to the housing 22.

As shown in FIGS. 3, 6, and 7, the retainer engagement part 82 includes a connecting part 84 for connecting the side walls 48B of the gutter-shaped portion 48 to each other. In the present embodiment, as shown in FIGS. 3, 6, and 7, a pair of protruding portions 86 are provided rearward of the connecting part 84.

As shown in FIG. 6, the connecting part 84 is provided at a location in the rear part of the gutter-shaped portion 48, and above the engagement portion 54. The connecting part 84 includes a pair of extensions 88 protruding upward from the upper edges of the left and right side walls 48B of the gutter-shaped portion 48, and a pair of engagement pieces 90 extending from the respective upper edges of the extensions 88 in the laterally opposite directions to each other. The engagement pieces 90 have respective protruding portions 90A and 90B protruding in the opposite directions to each other. One protruding portion 90A of a corresponding engagement piece 90 is located frontward of the other protruding portion 90B. The protruding portions 90A and 90B are bent toward each other (i.e., toward the opposite engagement pieces 90), thereby causing the engagement pieces 90 to be alternately connected to each other.

The protruding portions 86 are located rearward of the connecting part 84 and plate-like shaped pieces extending upward from the upper edges of the respective side walls 48B of the gutter-shaped portion 48.

When the insertion of a terminal member 38 is complete, followed by the insertion of a retainer 68, each terminal locking part 74 projects into a space between a pair of protruding portions 86 such that the front surface 74B of the terminal locking part 74 contacts the rear edge of the connecting part 84. In this way, the front surface 74B of the terminal locking part 74 restricts the rearward movement of the terminal locking part 74. However, the form of engagement between a terminal locking part and a terminal member is not limited to this. For example, a terminal locking part 74 may be provided with a receiving recess adapted to receive at least one of the protruding portions 86. In this case, a terminal member 38 may be locked to the housing 22 by the protruding portion(s) 86 projecting into the receiving recess to thereby restrict the front-rear movement of the terminal member 38.

In some cases, as shown in FIG. 13, when the insertion of a terminal member 38 is not complete but a retainer 68 is inserted and pushed downward (indicated by white arrow), the connecting part 84 comes into contact with an inclined surface 74A. In this case, the contact between the connecting part 84 and the inclined surface 74A pushes the terminal member 38 further frontward (indicated by black arrow), thereby allowing the terminal member 38 to be moved toward the completely inserted position and guiding the frontward movement of the terminal member 38 into a more appropriate insertion position.

Figure 14:
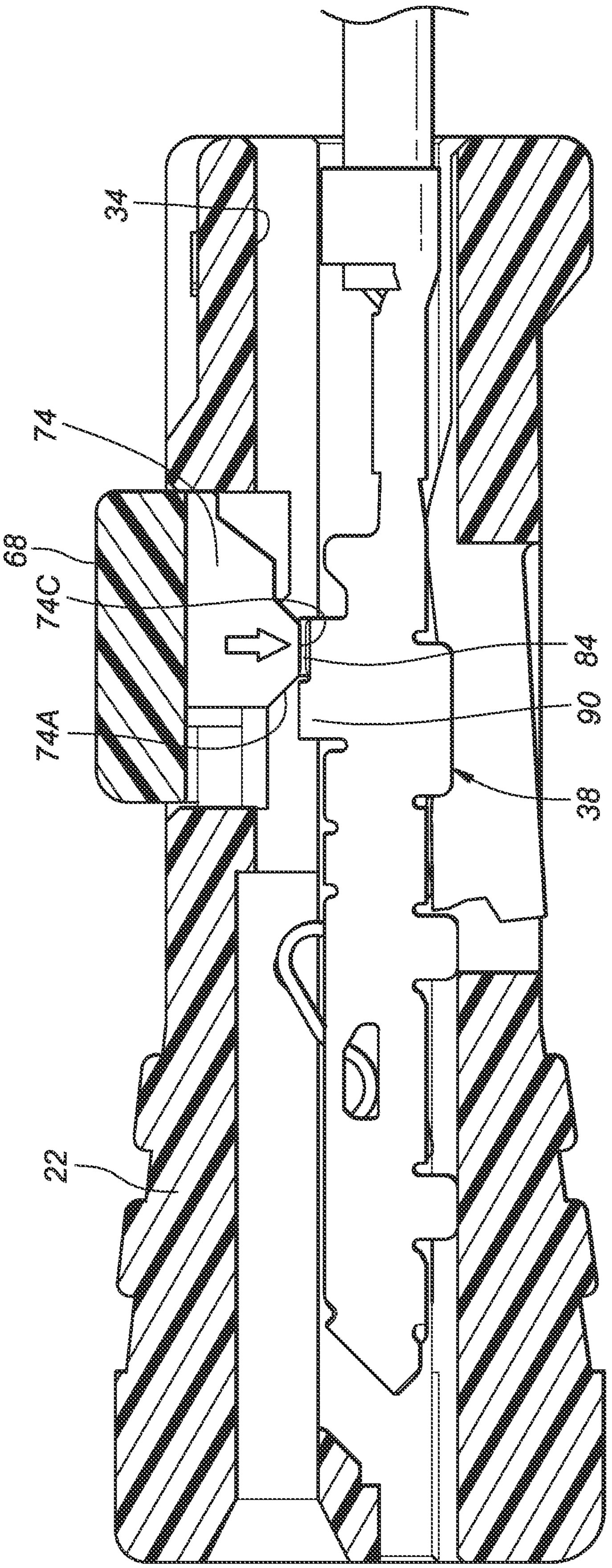
FIG. 14 is an explanatory diagram showing how a retainer inserted from above abuts a retainer engagement part of a terminal member which is not completely inserted into a terminal hole.

In other cases, as shown in FIG. 14, when the insertion of a terminal member 38 is not complete but a retainer 68 is inserted and pushed downward (indicated by white arrow), the horizontal lower surface 74C of a terminal locking part 74 contacts the engagement pieces 90 from above. In this case, since the two engagement pieces 90 are connected to and supported by each other, a load applied from the horizontal lower surface 74C of the terminal locking part 74 to the connecting part 84 can be distributed to the respective side walls 48B of the gutter-shaped portion 48, which reduces mechanical load bias on the terminal member 38 to prevent deformation of the terminal member 38.

Figure 15:
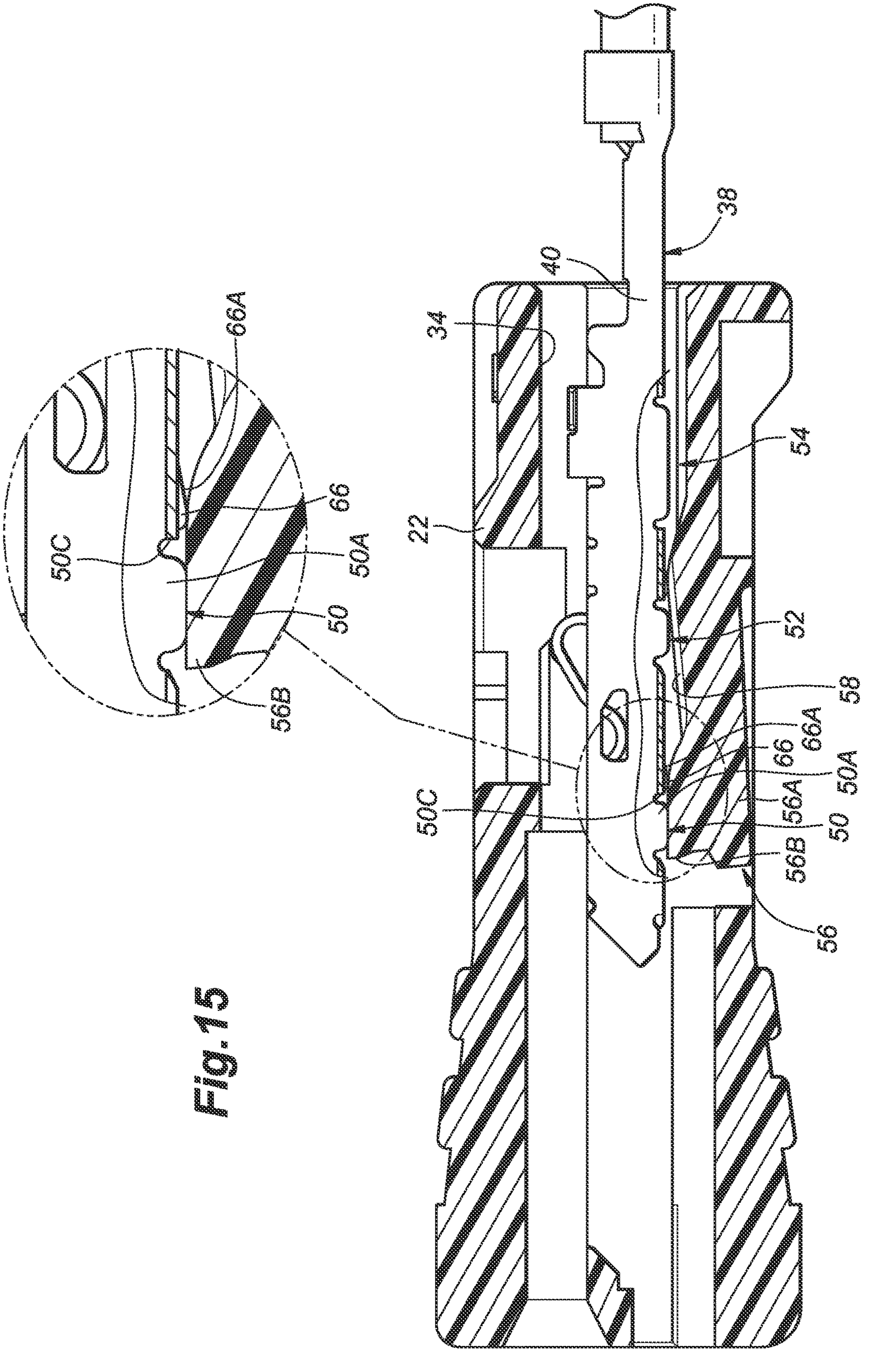
FIG. 15 is a cross-sectional view of the connector when a terminal member is being inserted, showing how a front-side projection formed on the terminal member abuts a free end of a lance piece, along with an enlarged view of an area defined by a two-dot chain line.
Figure 16:
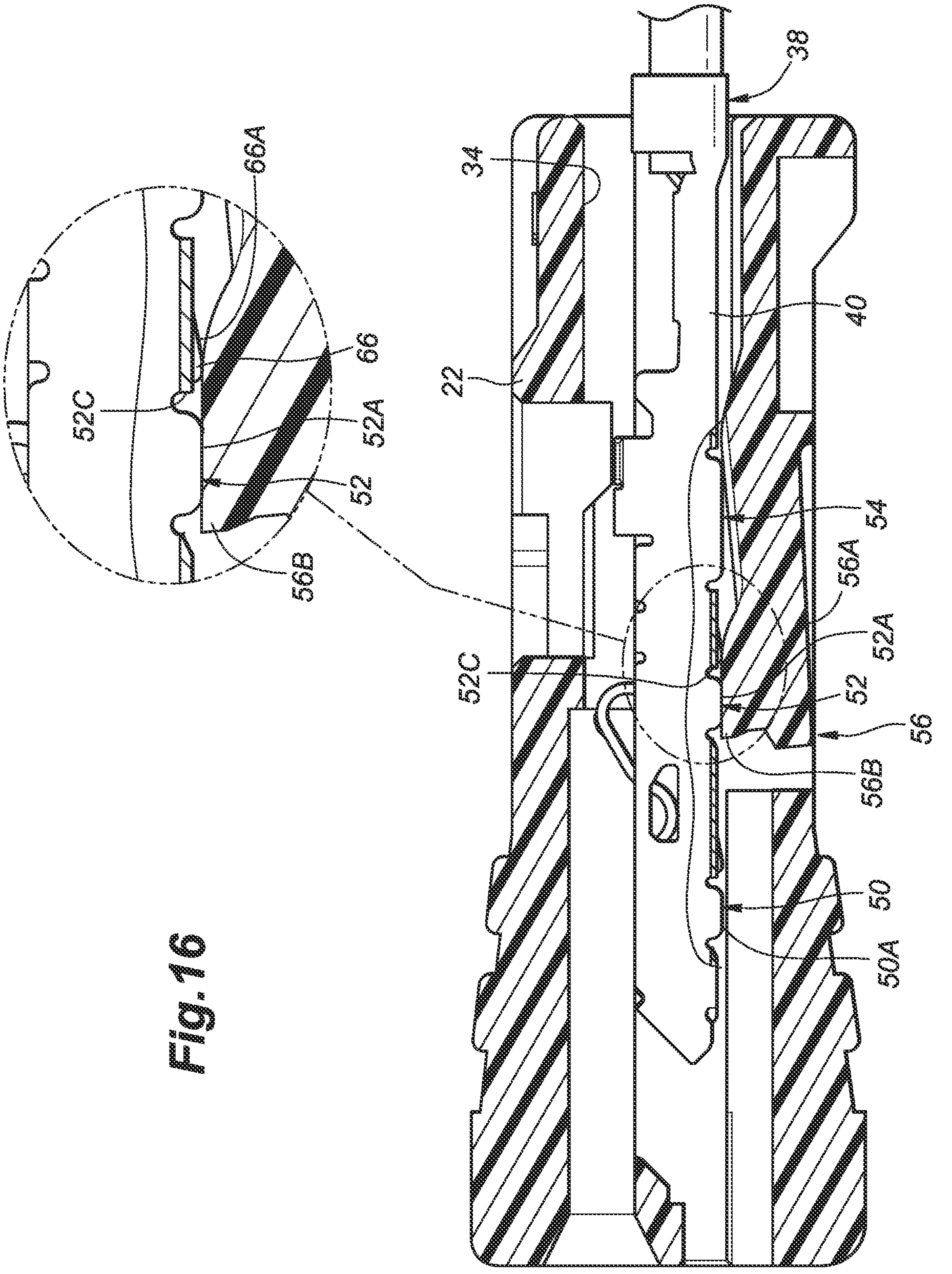
FIG. 16 is a cross-sectional view of the connector when a terminal member is being inserted, showing how a rear-side projection formed on the terminal member abuts a free end of a lance piece, along with an enlarged view of an area defined by a two-dot chain line.

Next, technical effects of a terminal member 38 will be described, with particular reference to the effect of a projection 66 when a terminal member 38 is inserted into a terminal hole 34. As shown in FIGS. 15 and 16, when a terminal member 38 is inserted into a terminal hole 34 from the rear and pushed frontward, a projection 66 contacts a protruding surface of a protruding portion 56B and a free end of a lance piece 56A moves downward. This configuration prevents the lance piece 56A from engaging a stabilizer opening 50C, 52C. Furthermore, a worker working on installation of a terminal member 38 is prevented from wrongly perceiving that the insertion of a terminal member 38 is complete due to a feel of the engagement between the protruding portion 56B and the stabilizer opening 50C, 52C. In this way, the configuration can prevent a worker working on installation of a terminal member 38 from wrongly perceive that the insertion of a terminal member is completed despite not having achieved the engagement between the lance piece 56A and an engagement opening 54C.

In the present embodiment, the front-rear distance (the distance in the front-rear direction) between the front edge of a stabilizer opening 50C, 52C and that of a projection 66 is shorter than the front-rear length of a protruding portion 56B. As a result, as shown in FIGS. 15 and 16, when the front-rear position (the position along the front-rear direction) of the front edge of the protruding portion 56B coincides with the front-rear position of the front edge of the stabilizer opening 50C, 52C, the protruding portion 56B is in contact with the projection 66. This means that, when the front-rear position of the front edge of the protruding portion 56B coincides with the front-edge position of the front edge of the stabilizer opening 50C, 52C during insertion, the projection 66 pushes the protruding portion 56B downward so that the front edge of the protruding portion 56B is never engaged with the front edge of the stabilizer opening 50C, 52C, thereby preventing a worker working on installation of a terminal member 38 from wrongly perceive that the insertion of a terminal member is completed due to a feel of the engagement between the protruding portion and the stabilizer opening despite not having achieved the engagement between the lance piece 56A and an engagement opening 54C.

Figure 17:
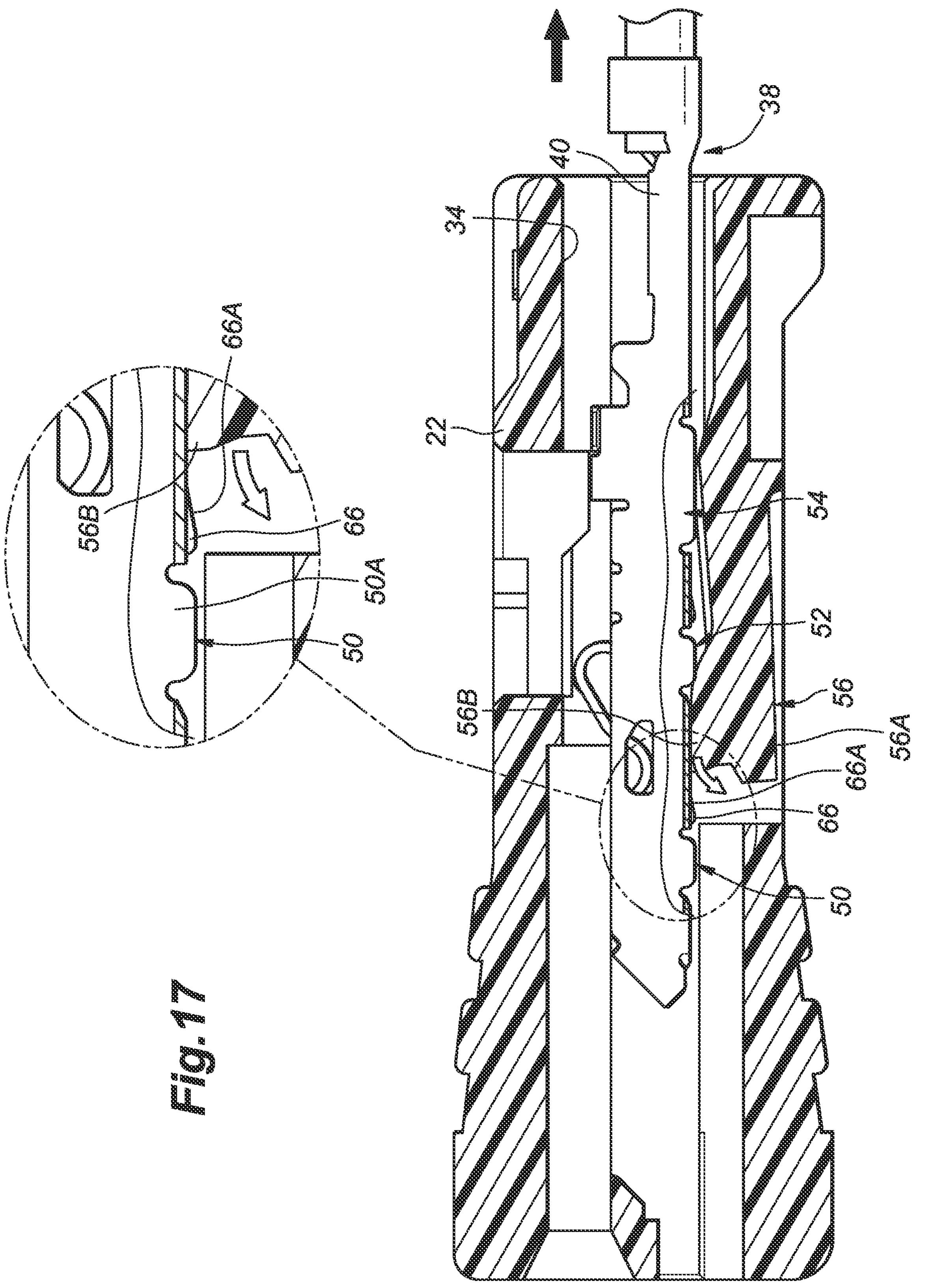
FIG. 17 is a cross-sectional view of the connector when a terminal member stops moving inward for insertion before being pulled out from the connector, along with an enlarged view of an area defined by a two-dot chain line.

In cases where the insertion of a terminal member 38 is not completed, as shown in FIG. 17, for example, when an assembly worker realizes that a terminal member 38 is mistakenly inserted into an incorrect terminal hole 34 which is not a corresponding terminal hole into which the terminal member 38 is supposed to be inserted, the worker should pull out (remove) the terminal member 38 from the incorrect terminal hole (indicated by black arrow). However, in the present embodiment, a projection 66 is positioned near the rear edge of a stabilizer opening 50C, 52C, a free end of a lance piece 56A moves downward along an inclined surface 66A of the projection 66 to be away from the terminal member 38 (indicated by white arrow in FIG. 17) before the free end of the lance piece 56A reaches the stabilizer opening 50C, 52C. Thus, when the terminal member 38 is pulled out for removal, the free end of the lance piece 56A is prevented from being caught on the stabilizer opening 50C, 52, which facilitates removal of the terminal member 38 from a housing 22.

Figure 18:
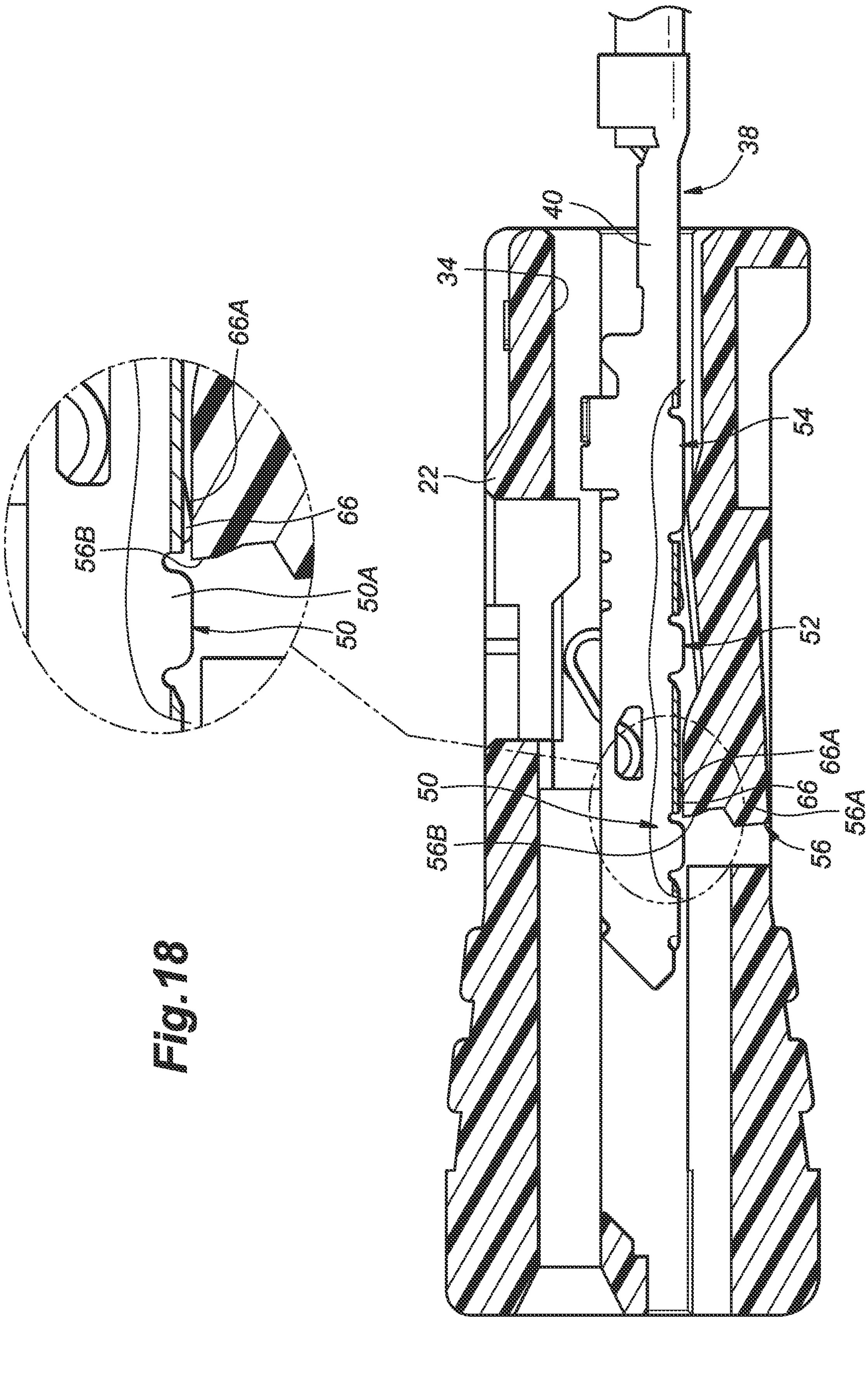
FIG. 18 is a cross-sectional view of the connector when the terminal member is being pulled out from the state shown in FIG. 17, along with an enlarged view of an area defined by a two-dot chain line.

Furthermore, in the present embodiment, a rear portion of the projection 66 defines an inclined surface that slopes upward (to be close to the terminal body 40) toward the rear. Thus, when a terminal member 38 is being pulled out for removal, the free end of the lance piece 56A is pressed by the inclined surface to gradually move downward by the slope. Thus, as shown in FIG. 18, the free end of the lance piece 56A is smoothly moved away from the terminal member 38. This feature prevents the free end of the lance piece 56A from being caught on the projection 66, which facilitates removal of the terminal member 38 from the housing 22.

Specific embodiments of the present invention have been described herein for illustrative purposes. However, it should be understood by one skilled in the art that the present invention is not limited to those specific embodiments, and various changes may be made thereto without departing from the scope of the present invention. For example, a connector 10 to be connected to a card edge 14 has been described above, but the type of a connector is not limited to this. More specifically, the connector 10 may be of any type configured such that a housing lance portion 56 can be locking engagement with a terminal member 38 in a terminal hole 34, the terminal member 38 having a stabilizer 50 and an engagement portion 54. For example, a connector 10 may be one configured to connect two sets of core wires 36A to each other.

In the embodiments of a connector as described above, not all elements thereof are essential. Thus, various modifications including elimination of some elements may be made to the embodiments as appropriate without departing from the scope of the invention.

For example, in the above embodiment, two stabilizers 50 and 52 are defined in a terminal member 38, but the number of the stabilizers is not limited to this. A terminal member 38 may have one stabilizer 50 (52) or three or more stabilizers. In the above embodiments, a lance piece 56A is in the form of a cantilever beam, but the form of a lance piece is not limited to this. Specifically, a lance piece may be in any form as long as the lance piece can be in locking engagement with a terminal member 38. In the above embodiments, a lance piece 56A is arranged to define part of the bottom surface of a terminal hole 34, but the arrangement of the lance piece 56A is not limited to this. For example, a wall defining the bottom surface of a terminal hole 34 may define a through-hole so that a lance piece 56A can project into the through-hole to be engaged with the engagement opening 54C.

Figure 20A:
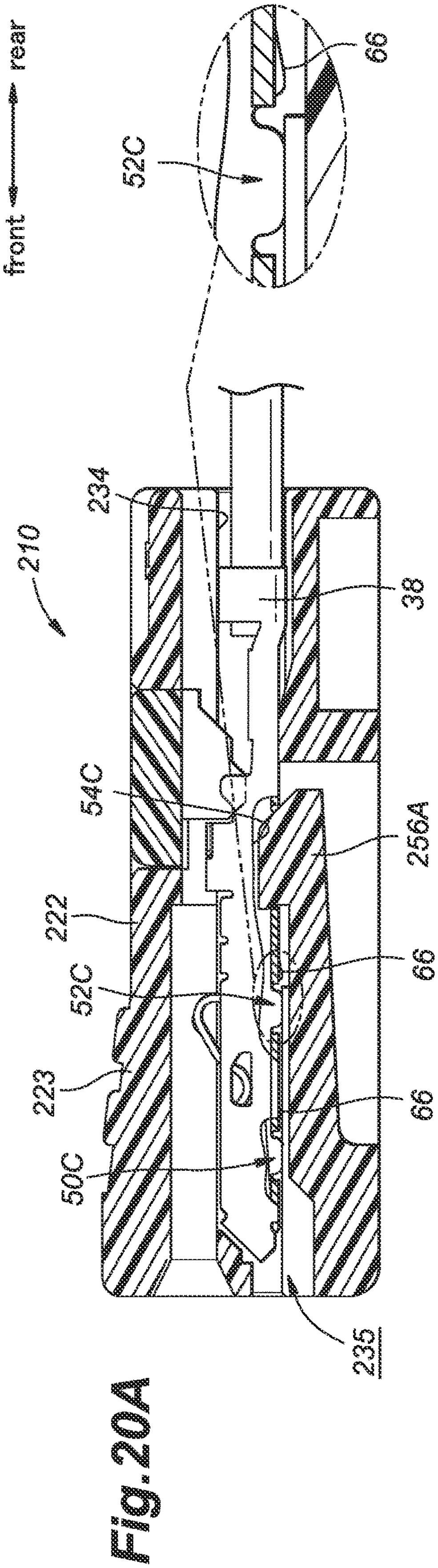
FIGS. 20A and 20B (collectively FIG. 20) are explanatory diagrams showing different forms of a lance piece according to other embodiments of the present invention, where

In the above embodiments, a lance piece 56A is in the form of a cantilever beam extending out from the rear to the front (in the insertion direction), but the form of a lance piece is not limited to this. In other embodiments, as shown in FIG. 20A, a connector 210 includes a housing 222 having terminal holes 234, each terminal hole defining a terminal receptacle compartment 235; and terminal members 38 each configured to be inserted into a terminal hole 234 from the rear to the front (in the insertion direction) in the same manner as the above embodiments, wherein the housing 222 has a housing body 223 and lance pieces 256A integrally formed with the housing body 223 and cooperatively defining the terminal holes 234, and wherein each lance piece 256A may be in the form of a cantilever beam coupled to the housing body 223 and extending out from the front to the rear (i.e., in the opposite direction to the insertion direction). The lance piece 256A is configured to project into the engagement opening 54C of a terminal member 38 to thereby secure the terminal member 38 to the housing 222 in a similar manner to the above embodiments. As in the above embodiments, projections 66 are preferably formed at locations rearward of and near the rear edges of two stabilizer openings 50C and 52C, respectively.

Figure 20B:
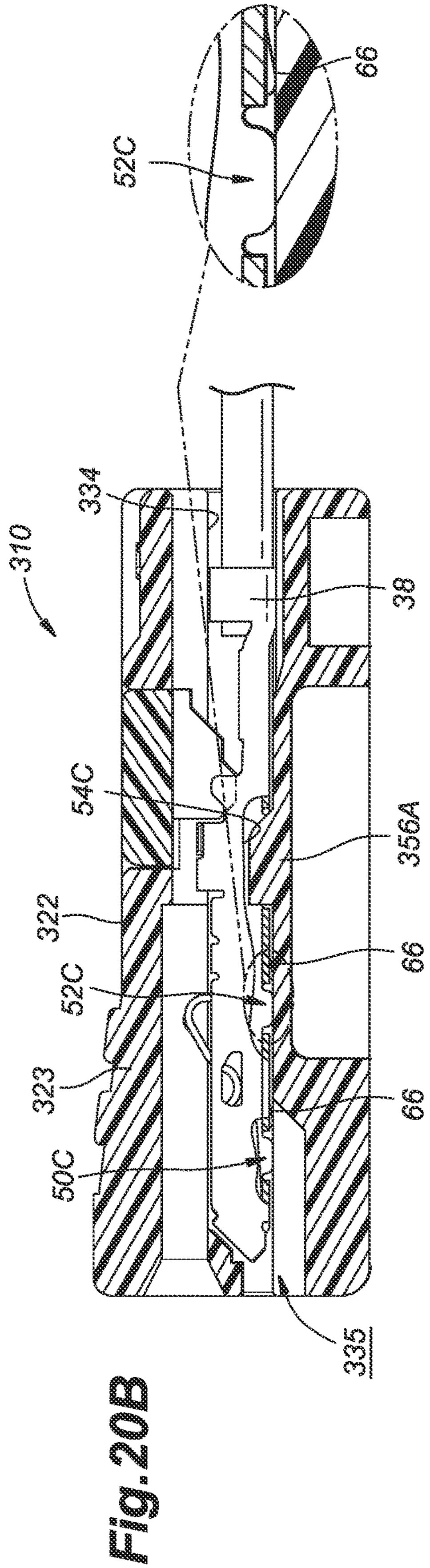

In an embodiment as shown in FIG. 20B, a connector 310 has a housing 322 having terminal holes 334 defining respective terminal receptacle compartments 335; and terminal members 38 each configured to be inserted into a terminal hole 334 from the rear to the front (in the insertion direction) in the same manner as the above embodiments, wherein the housing 322 has a housing body 323, and lance pieces 356A cooperating with the housing body to define respective terminal holes 334, and each lance piece 356A may be in the form of a double-supported beam coupled to the housing body 223 at both the front and rear ends thereof. A lance piece 356A is configured to project into the engagement opening 54C of a terminal member 38 to thereby secure the terminal member 38 to the housing 222 in a similar manner to the above embodiments. Furthermore, as in the above embodiments, projections 66 are preferably formed at locations rearward of and near the rear edges of two stabilizer openings 50C and 52C, respectively.

Figure 21:
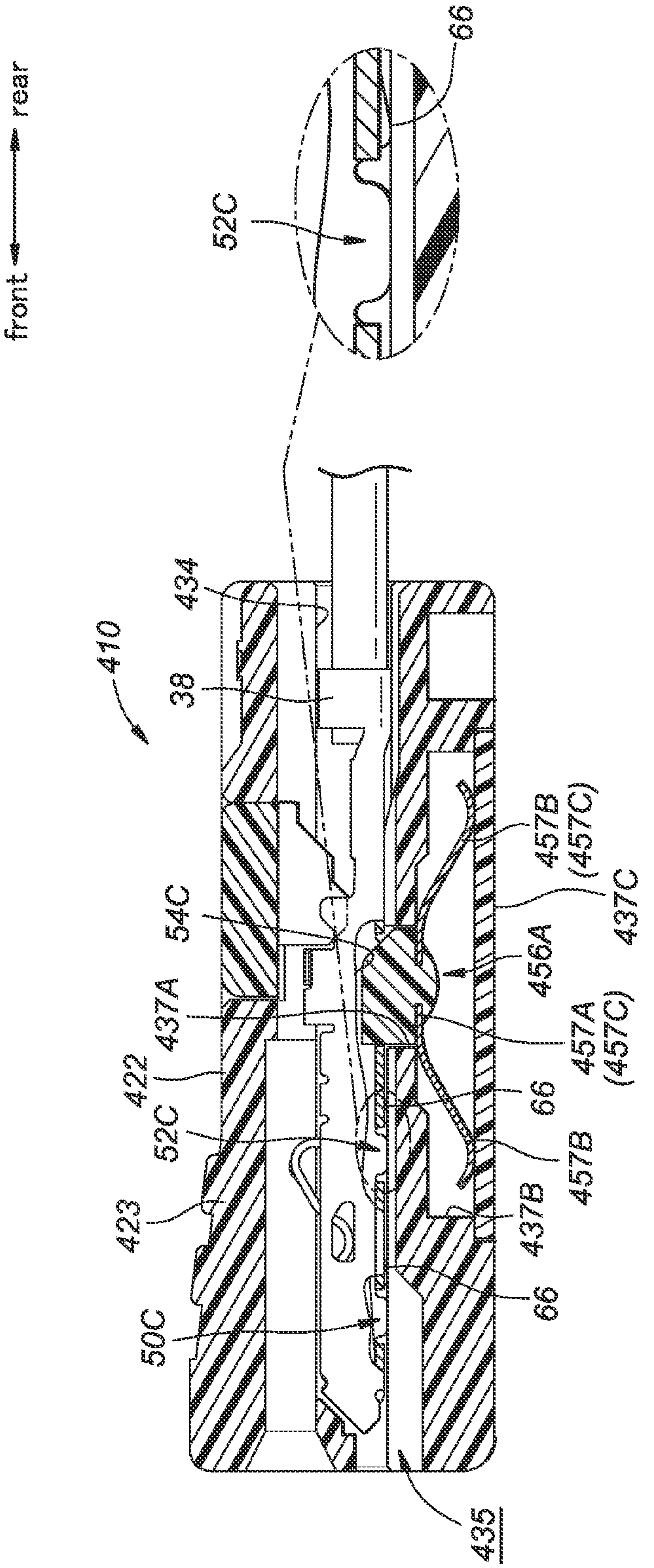
FIG. 21 is an explanatory diagram showing a lance piece provided with a spring piece according to another embodiment of the present invention.

In other embodiments, a connector 410 includes a housing 422 including a housing body 423 defining terminal receptacle compartments 435 and respective lance pieces 456A formed separately from the housing body 423. More specifically, as shown in FIG. 21, the housing body 423 may be configured to have terminal holes 434; a recess 437B defining communication holes and communicably connected to the respective terminal holes 434 via the communication holes; and lid 437C configured to seal respective communication paths to the recess 437B, wherein each lance piece 456A may include an engagement portion 457A that can project into a corresponding terminal hole 434 via a communication hole 437A; and an elastic body 457B provided between the engagement portion 457A and the lid 437C. In one embodiment as shown in FIG. 21, the elastic body 457B is composed primarily of two metal spring pieces 457C. However, the form of an elastic body is not limited to this, and may be one comprising one or more metal sheet spring pieces or coil springs. In some cases, the elastic body may be formed of rubber or any other suitable material. A lance piece 456A is configured to project into the engagement opening 54C of a terminal member 38 to thereby secure the terminal member 38 to the housing 222 in a similar manner to the above embodiments. Furthermore, as in the above embodiments, projections 66 are preferably formed at locations rearward of and near the rear edges of two stabilizer openings 50C and 52C, respectively.

Figure 22:
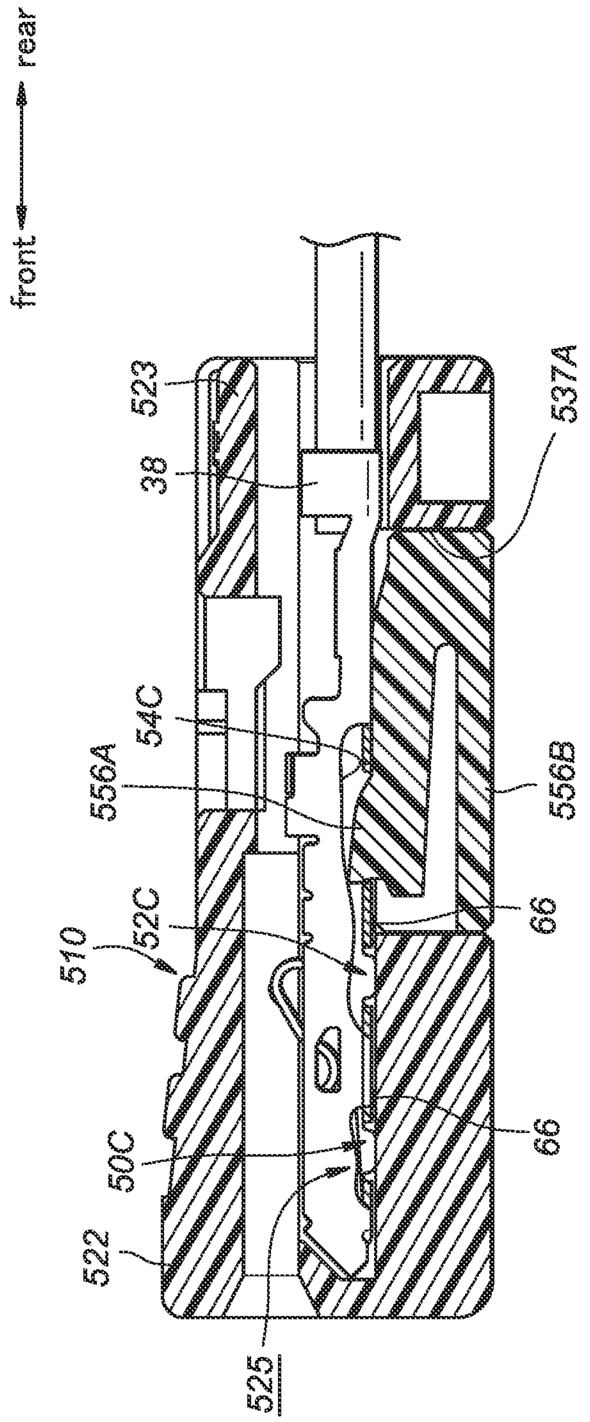
FIG. 22 is an explanatory diagram showing a lance piece formed in a lance base member that is a separate plastic piece from a housing body.

In other embodiments, a lance piece 556A may be a plastic lance base member 556B separate from a housing body 523. In an embodiment shown in FIG. 22, a connector 510 is configured to have a housing 522 including a housing body 52, wherein the housing body 52 defines a side hole 537A communicably connected to respective terminal receptacle compartments 525, and wherein the lance base member 556B is inserted into the side hole. Although FIG. 22 does not show how the lance base member 556B is secured to the housing body 523, the lance base member 556B may be secured to the housing body 523 by using claws, for example. The configuration in which a connector comprises a lance base member 556B separate from the housing body 523 is effectively used in some cases, such as when a design renders it difficult to provide a passage for removal of a mold (e.g., passage 62P in the above embodiment) is difficult, when a design adopts a body which not have any passage for removal of a mold, and when a design adopts a lance base member 556B made of a different material from that of a housing body 523.

A projection 66 may be in any form as long as the projection can prevent a lance piece 56A from being engaged with openings (accurately, the edges of openings) other than the opening with which the lance piece 56A is to be engaged (such as the engagement opening 54C in the above embodiments). A projection 66 may be located at any location, including frontward of, rearward of, or to a side of a corresponding opening other than the opening with which the lance piece 56A is to be engaged. Furthermore, any distance may be adopted as a distance between a projection 66 and the edge of a corresponding opening other than the opening with which the lance piece 56A is to be engaged, which distance is preferably determined as appropriate based on the features of a design, such as its shape.

Figure 19A:
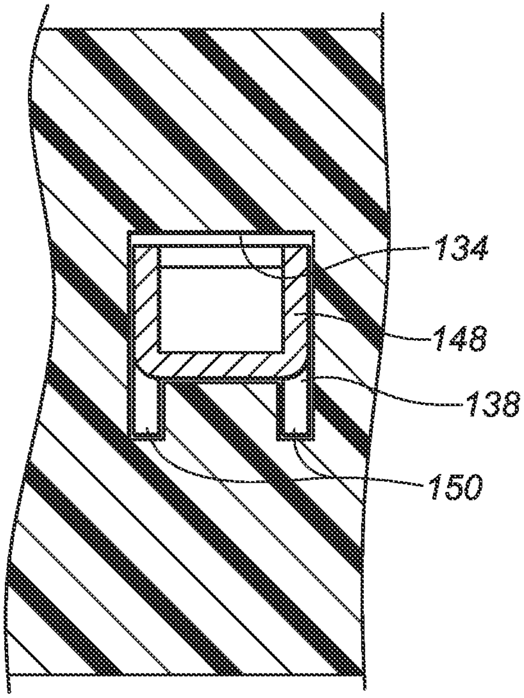
FIGS. 19A and 19B (collectively FIG. 19) are explanatory diagrams showing a terminal hole according to another embodiment of the invention, configured to prevent insertion of a terminal member that is inverted upside down therein, where
Figure 19B:
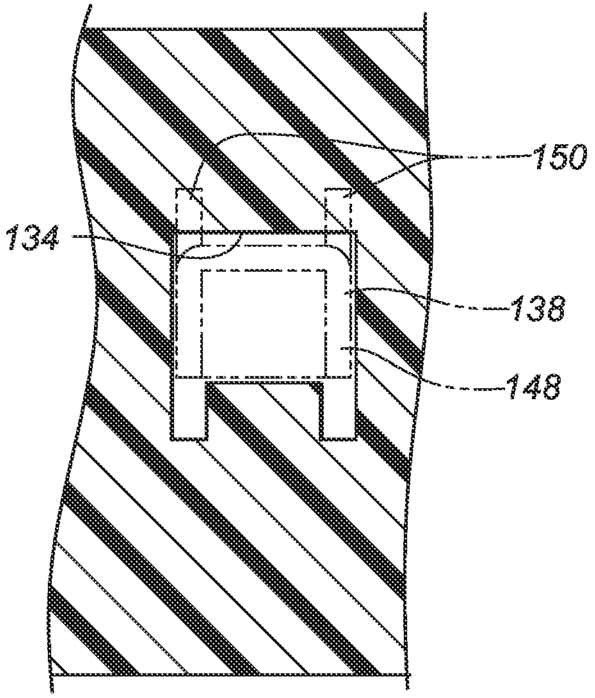

In the above embodiments, a terminal member 38 inverted upside down is prevented from being inserted into a terminal hole by different piece heights of pairs of left legs and right legs 50A (50B), 52A (52B), 54A (52B), but means for preventing insertion of, a terminal member 38 upside down is not limited thereto. For example, FIGS. 19A and 19B show a connector which can prevent incorrect installation of a terminal member 138 inverted upside down, in which a terminal hole has a cross section which corresponds to a gutter-shaped portion 148 with a U-shaped cross section in combination with a pair of legs 150 formed by cutting and bending parts of the bottom wall downward, and wherein the left and side legs 150 have the same piece heights.

Glossary

10 connectors
12 circuit Board
14 card edge connectors
16 board-side terminals
18 board-side locking part
20 main slit
22 housing
24 insertion slot recess
26 insertion inlet
28 receptacle compartment
30 center slit
32 partition wall
34 terminal hole
34A front wall
34B bottom wall
34C corner
34H recess
34L left side wall
34R right sidewall
34S beam-shaped guide
34U upper wall
35 terminal receptacle compartment
36 sheathed cable
36A core wire
36B wire sheath
38 terminal member
40 terminal body
42 contact piece
44 core wire barrel
46 wire sheath barrel
48 gutter-shaped portion
48A bottom wall
48B sidewall
50, 52 stabilizer
50A, 50B leg
50C stabilizer opening (opening, second opening)
52A, 52B leg
52C stabilizer opening (opening, second opening)
54 engagement portion
54A, 54B leg
54C engagement opening (opening, first opening)
56 housing lance portion
56A lance piece
56B protruding portion
58 ridge
58A groove
60A, 60B gap
62A groove
63B rear right curb
62C front left curb
62D front right curb
62P passage
62SA, 62SB horizontal surface
64 contact
66 projection
66A inclined surface
68 retainer
70 retainer body
72 retainer attachment claw
74 terminal locking part
74A inclined surface
74B front surface
74C horizontal lower surface
75 rib
76 retainer receptacle recess
78 communication hole
80 retainer engagement recess
82 retainer engagement part
84 connecting part
86 protruding portion
88 extension
90 engagement piece
90A, 90B protruding portion
134 terminal hole
138 terminal member
148 gutter-shaped portion
150 leg
210 connector
222 housing
223 housing body
234 terminal hole

235 terminal receptacle compartment
256A lance piece
310 connector
322 housing
323 housing body
334 terminal hole
335 terminal receptacle compartment
356A lance piece
410 connector
422 housing
423 housing body
434 terminal hole
435 terminal receptacle compartment
437A communication hole
437B recess
437C lid
456A lance piece
457A engagement portion
457B elastic body
457C metal spring piece
510 connector
522 housing
523 housing body
525 terminal receptacle compartment
537A communication hole
556A lance piece
556B lance base member
$A_L$ left piece height (projection height)
$A_R$ right piece height (projection height)

The invention claimed is:

1. A connector, comprising:

a housing having a terminal hole and an elastic locking piece, wherein the terminal hole defines a terminal receptacle compartment extending in a predetermined direction; and a terminal member adapted to be inserted into the terminal receptacle compartment in an insertion direction; that is, from a rear toward a front, wherein the terminal member includes:

a first opening with which the elastic locking piece is engaged when the terminal member is installed in the housing;

a second opening defined at a location on the front side of the first opening; and a projection is formed thereon so as to prevent the elastic locking piece from being engaged with the second opening when the terminal member is being inserted into or removed from the housing, wherein the terminal member is formed of a folded plate material, and wherein the terminal member has pairs of legs, each pair of legs vertically protruding from and extending along edges of both sides of a corresponding one of the first and second openings, wherein each pair of the legs consists of opposite legs having different projection heights, and wherein walls defining the terminal receptacle compartment include slide surfaces extending in the insertion direction at vertical locations corresponding to the projection heights of the legs so that the opposite legs can slide on the corresponding slide surfaces.

2. The connector as in claim 1, wherein, when the terminal member is inserted into the housing, the elastic locking piece can be located between each pair of the legs so as to slidingly guide the movement of the terminal member along the insertion direction.

3. The connector as in claim 1, wherein the elastic locking piece of the housing is a cantilevered piece that extends out in the insertion direction so as to partially define the terminal receptacle compartment, and wherein the terminal member has the projection formed at a location rearward of the second opening.

4. The connector as in claim 3, wherein a protruding portion is provided at a free end of the elastic locking piece, the protruding portion having a length along the insertion direction that is longer than that of the second opening and shorter than that of the first opening.

5. The connector as in claim 3, wherein a rear portion of the projection defines an inclined surface that slopes rearward toward an upper surface of the terminal member.

6. The connector as in claim 4, wherein, when a front edge of the protruding portion is located at a position of a front edge of the second opening along the insertion direction, the projection abuts the protruding portion.

7. A connector, comprising:

a housing having a terminal hole and an elastic locking piece, wherein the terminal hole defines a terminal receptacle compartment extending in a predetermined direction; and a terminal member adapted to be inserted into the terminal receptacle compartment in an insertion direction; that is, from a rear toward a front, wherein the terminal member has a first opening with which the elastic locking piece is engaged when the terminal member is installed in the housing;

a second opening defined at a location on the front side of the first opening; and a projection is formed thereon so as to prevent the elastic locking piece from being engaged with the second opening when the terminal member is being inserted into or removed from the housing, wherein the elastic locking piece of the housing is a cantilevered piece that extends out in the insertion direction so as to partially define the terminal receptacle compartment, wherein the terminal member has the projection formed at a location rearward of the second opening, wherein a protruding portion is provided at a free end of the elastic locking piece, the protruding portion having a length along the insertion direction that is longer than that of the second opening and shorter than that of the first opening, and wherein, when a front edge of the protruding portion is located at a position of a front edge of the second opening along the insertion direction, the projection abuts the protruding portion.

8. A connector, comprising:

a housing having a terminal hole and an elastic locking piece, wherein the terminal hole defines a terminal receptacle compartment extending in a predetermined direction; and a terminal member adapted to be inserted into the terminal receptacle compartment in an insertion direction; that is, from a rear toward a front, wherein the terminal member has a first opening with which the elastic locking piece is engaged when the terminal member is installed in the housing;

a second opening defined at a location on the front side of the first opening; and a projection is formed thereon so as to prevent the elastic locking piece from being engaged with the second opening when the terminal member is being inserted into or removed from the housing, wherein the elastic locking piece of the housing is a cantilevered piece that extends out in the insertion direction so as to partially define the terminal receptacle compartment, wherein the terminal member has the projection formed at a location rearward of the second opening, and wherein a rear portion of the projection defines an inclined surface that slopes rearward toward an upper surface of the terminal member.

* * * * *